(12) United States Patent
Ahmed et al.

(10) Patent No.: US 12,546,110 B1
(45) Date of Patent: Feb. 10, 2026

(54) 3D PRINTED CONSTRUCTION ELEMENT

(71) Applicant: United Arab Emirates University, Al Ain (AE)

(72) Inventors: Waleed Ahmed, Al Ain (AE); Ali Al Marzouqi, Al Ain (AE); Essam Zaneldin, Al Ain (AE); Noura Almazrouei, Al Ain (AE); Amged Elhassan, Al Ain (AE); Muthanna Aziz, Al Ain (AE)

(73) Assignee: UNITED ARAB EMIRATES UNIVERSITY, Al-Ain (AE)

( * ) Notice: Subject to any disclaimer, the term of this patent is extended or adjusted under 35 U.S.C. 154(b) by 0 days.

(21) Appl. No.: 19/199,710

(22) Filed: May 6, 2025

Related U.S. Application Data

(62) Division of application No. 18/800,579, filed on Aug. 12, 2024, now Pat. No. 12,331,518.

(51) Int. Cl.
*E04C 1/41* (2006.01)
*B28B 1/00* (2006.01)
(Continued)

(52) U.S. Cl.
CPC ............... *E04C 1/41* (2013.01); *B28B 1/001* (2013.01); *B28B 17/0081* (2013.01);
(Continued)

(58) Field of Classification Search
CPC ....... E04C 1/41; B28B 1/001; B28B 17/0081; B29C 64/10; B29C 64/106; B29C 64/165; B29C 64/188; B29C 64/194; B29C 64/118; B33Y 10/00; B33Y 30/00; B33Y 50/02; B33Y 80/00
See application file for complete search history.

(56) References Cited

U.S. PATENT DOCUMENTS 4,148,166 A * 4/1979 Toone ...................... E04C 1/41
52/270
4,433,521 A * 2/1984 Dietrich .................... E04C 1/41
52/421

(Continued)

FOREIGN PATENT DOCUMENTS

WO WO2022251571 * 12/2022

*Primary Examiner* — Jeffrey M Wollschlager
(74) *Attorney, Agent, or Firm* — MH2 Technology Law Group, LLP

(57) ABSTRACT

The present disclosure is directed to a construction element produced by additive manufacturing, an additive manufacturing system for producing the construction element and a method for manufacturing the construction element. The construction element includes an outer layer. The outer layer is configured to define or form an enclosure. The construction element further includes an inner matrix. The inner matrix is formed within the enclosure. The outer layer and the inner matrix are formed integrally, by depositing successive layers using an additive manufacturing system. The inner matrix is defined by a first layup and a second layup. The first layup is laid along a first direction and across the enclosure. The second layup is laid juxtaposing the first layup. The first layup and the second layup define a plurality of air pockets in the inner matrix. Further, a filler material is infused into at least some air pockets of the plurality of air pockets.

16 Claims, 21 Drawing Sheets

(51) Int. Cl.
  *B28B 17/00* (2006.01)
  *B29C 64/118* (2017.01)
  *B33Y 10/00* (2015.01)
  *B33Y 30/00* (2015.01)
  *B33Y 50/02* (2015.01)
  *B33Y 80/00* (2015.01)

(52) U.S. Cl.
  CPC ............ *B29C 64/118* (2017.08); *B33Y 10/00* (2014.12); *B33Y 30/00* (2014.12); *B33Y 50/02* (2014.12); *B33Y 80/00* (2014.12)

(56) References Cited

U.S. PATENT DOCUMENTS

| | | | |
|---|---|---|---|
| 11,110,655 B2 | 9/2021 | Budge | |
| 11,781,307 B2 * | 10/2023 | Bertoldi | E04C 3/08 52/646 |
| 2002/0014051 A1 * | 2/2002 | Fraval | C04B 18/08 52/794.1 |
| 2007/0138678 A1 * | 6/2007 | Khoshnevis | E04G 21/0463 52/561 |
| 2015/0165683 A1 | 6/2015 | Cheverton | |
| 2015/0361460 A1 | 12/2015 | Botes | |
| 2017/0028633 A1 | 2/2017 | Evans | |
| 2017/0217088 A1 * | 8/2017 | Boyd, IV | B29C 64/106 |
| 2017/0274556 A1 * | 9/2017 | Gardiner | E04C 2/041 |
| 2018/0071987 A1 | 3/2018 | Tsumuraya | |
| 2018/0266106 A1 * | 9/2018 | Muirhead | E04C 2/041 |
| 2019/0248076 A1 | 8/2019 | Susnjara | |
| 2020/0032512 A1 | 1/2020 | Spreen | |
| 2020/0108870 A1 * | 4/2020 | Cho | B60R 19/18 |
| 2020/0270863 A1 * | 8/2020 | Pivac | C04B 14/108 |
| 2021/0053275 A1 | 2/2021 | Burke | |
| 2021/0114303 A1 | 4/2021 | Cook | |
| 2021/0246300 A1 * | 8/2021 | Poelma | B29C 64/165 |
| 2021/0277648 A1 * | 9/2021 | Dubov | E04C 2/365 |
| 2021/0402708 A1 | 12/2021 | Susnjara | |
| 2022/0064374 A1 * | 3/2022 | Chaplin | B29C 64/153 |
| 2023/0150187 A1 * | 5/2023 | Chaplin | D01F 6/665 264/308 |
| 2023/0234280 A1 * | 7/2023 | Cernohous | B21D 37/01 |
| 2023/0234282 A1 * | 7/2023 | Connal | C25D 1/00 |
| 2023/0331890 A1 | 10/2023 | Kirsankina | |
| 2023/0339140 A1 | 10/2023 | Na | |
| 2023/0390959 A1 | 12/2023 | Na | |
| 2024/0033967 A1 | 2/2024 | Kenny | |
| 2024/0067885 A1 | 2/2024 | Xu | |
| 2024/0247483 A1 * | 7/2024 | Plesnik | E04B 2/18 |
| 2024/0247488 A1 * | 7/2024 | Narendran | B33Y 80/00 |
| 2024/0262005 A1 | 8/2024 | Jacquet | |
| 2024/0279939 A1 * | 8/2024 | Dubov | E04G 21/06 |

* cited by examiner

3D PRINTED CONSTRUCTION ELEMENT

CROSS-REFERENCE TO RELATED APPLICATIONS

This application is a divisional of U.S. application of Ser. No. 18/800,579, filed 12 Aug. 2024, the entire disclosure of which is incorporated herein by reference.

TECHNOLOGICAL FIELD OF THE INVENTION

The present disclosure in general relates to the field of additive manufacturing. The present disclosure is further directed towards an additive manufacturing system and a method for manufacturing a construction element. The present disclosure is also directed towards the construction element for constructional applications such as walls, building portions, partitions, and the like.

BACKGROUND

The information in this section merely provides background information related to the present disclosure and may not constitute prior art(s) for the present disclosure.

Conventional construction methods include use of a basic building block, such as traditional bricks made from clay, concrete and the like, for construction of building structures and/or walls. Producing said building blocks require abundant quantity of raw materials, and accordingly, the building structures and the walls are bulky due to inherent weight associated with such building blocks. As a part of technological advancement, an improved method in the field of construction is the implementation of additive manufacturing technology (also referred to as 3D printing). In 3D printing process, the construction material is deposited in a layer-by-layer fashion, within a predefined layout, to form the building structures. Employing such 3D printing process in the field of construction has resulted in improved speed of construction and has comparatively decreased requirement of skilled laborers. While the 3D printing process has reduced time consumption in constructing building structures, structural integrity issues still remain. The building structures made from the 3D printing process tends to suffer from issues such as weak interlayer bonding and lack of accurate material fillings.

Further, conventional bricks and concrete blocks, when subjected to sunlight and/or hot weather, by virtue of their basic nature, retain heat and lead to elevated temperature inside the building structures. Such elevation of heat within the building structures generally increases need for air conditioning and ventilation, whereby increasing energy costs associated with the building structures. Hence, there exists a requirement for construction of building structures that provide improved thermal insulation and reduce associated energy costs.

Furthermore, construction of the building structures produces high amounts of construction waste, which is often regarded as environmentally hazardous. Hence, minimizing such constructional waste for carbon footprint associated with the building structures is desirable, to promote environmental sustainability. Accordingly, there exists a need for overcoming one or more limitations stated above or any other limitations associated with construction of building structures, by use of additive manufacturing technologies.

GENERAL DESCRIPTION

A first aspect of the disclosure concerns a construction element produced by additive manufacturing. The construction element includes an outer layer. The outer layer is configured to define or form an enclosure. The construction element further includes an inner matrix. The inner matrix is formed within the enclosure. The outer layer and the inner matrix are formed integrally, by depositing successive layers using an additive manufacturing system. The inner matrix is defined by a first layup and a second layup. The first layup is laid along a first direction and across the enclosure. The second layup is laid juxtaposing the first layup. The first layup and the second layup define a plurality of air pockets in the inner matrix. Further, a filler material is infused into at least some air pockets of the plurality of air pockets.

According to a configuration of the first aspect, the outer layer is made of a first material and the inner matrix is made of a second material. The outer layer and the inner matrix are integrally formed by depositing successive layers of the first material and the second material.

According to a configuration of the first aspect, the first material forming the outer layer is same as that of the second material forming the inner matrix.

According to a configuration of the first aspect, the filler material is different from the material of the outer layer and the inner matrix. Further, the filler material is made of a third material.

According to a configuration of the first aspect, the inner matrix is made of material including a blend of clay, plastic particles, and powder carbon particles.

According to a configuration of the first aspect, the second layup is laid along a second direction. The second direction is different from the first direction and across the enclosure.

According to a configuration of the first aspect, the first layup and the second layup crisscross each other at an angle in a range of 40 degrees to 50 degrees.

According to a configuration of the first aspect, the first layup and the second layup crisscross at an angle of substantially 45 degrees.

According to a configuration of the first aspect, the plurality of air pockets constitute at least 50 percent of volume of space within the enclosure.

According to a configuration of the first aspect, at least some air pockets of the plurality of air pockets is infused with filler material, to form a contour of predetermined shape in the construction element.

According to a configuration of the first aspect, the construction element includes one or more inner layers. The one or more inner layers have substantially same configuration as that of the outer layer. Further, the one or more inner layers and the outer layer is configured to define one or more cavities in the inner matrix.

According to a configuration of the first aspect, at least some of the one or more cavities is configured to receive an insert made of an insulating material.

According to a configuration of the first aspect, at least some cavities of the one or more cavities are defined proximal to a periphery of the outer layer or proximal to a periphery of the one or more inner layers.

According to a configuration of the first aspect, at least some cavities of the one or more cavities are defined substantially centrally in the inner matrix and away from a periphery of the outer layer.

According to a configuration of the first aspect, the one or more cavities are C-shaped, S-shaped, arcuate shaped, semicircular shaped, and rectangular shaped.

According to a configuration of the first aspect, the insulating material comprises at least one of a compressed plastic waste and compressed natural fibers.

According to a configuration of the first aspect, the compressed natural fibers include at least one of dried and milled palm trunk wood, dried palm leaves, date palm tree leaves, crushed date pit and wood. The said compressed natural fibers are compressed by using binders including okra powder along with water.

A second aspect of the disclosure concerns an additive manufacturing system for producing a construction element. The additive manufacturing system includes an extruder. The extruder is configured to extrude material layer-by-layer for producing the construction element. The system further includes a sensor module. The sensor module is connectable to the extruder. The sensor module is configured to detect one or more predetermined parameters of the construction element. The system includes a mechanism engageable with the extruder. The mechanism is configured to introduce reinforcement into the construction element and is adapted to regulate predetermined characteristics of each layer of the construction element. In addition, the system includes a control unit. The control unit is communicatively coupled to the extruder, the sensor module and the mechanism. The control unit is configured to regulate movement of the extruder, based on signals corresponding to the one or more predetermined parameters received from the sensor module. The control unit is further configured to operate the mechanism selectively, to regulate introduction of reinforcement into the construction element, and to regulate one or more of the predetermined characteristics of the construction element.

According to a configuration of the second aspect, the mechanism includes a spool unit and a swing arm. The spool unit is configured to selectively introduce a reinforcement member into the construction element. The swing arm is coupled to the spool unit. The swing arm is configured to swing relative to at least one of the extruder and the spool unit. The swing arm includes a first rotary element, a second rotary element, and an actuator. Further, the swing arm is configured to selectively engage one of the first rotary element or the second rotary element with layers of the construction element, to regulate the predetermined characteristics of the construction element.

According to a configuration of the second aspect, the control unit is configured to operate the mechanism as follows. The control unit is configured to operate the spool unit, to introduce the reinforcement member into a layer of the construction element. The control unit is further configured to operate the actuator associated with the swing arm, to selectively engage one of the first rotary element or the second rotary element with the layer of the construction element. Further, operation of the spool unit and the swing arm is configured to regulate the predetermined characteristics of each layer of the construction element.

According to a configuration of the second aspect, the first rotary element, upon engagement with each layer of the construction element, is configured to traverse over each layer to alter characteristics of a surface each layer.

According to a configuration of the second aspect, the first rotary element is a herringbone gear. The first rotary element upon traversing over each layer of the construction element, imprints herringbone pattern on the surface of each layer.

According to a configuration of the second aspect, the second rotary element is a flattening wheel. Further, the second rotary element upon traversing over each layer of the construction element, flattens the surface of each layer.

According to a configuration of the second aspect, the mechanism includes an injector. The injector is configured to infuse a filler material into at least some air pockets of a plurality of air pockets defined in the construction element.

A third aspect of the disclosure concerns a method for manufacturing a construction element. The method includes operating, by a control unit, an extruder to extrude an outer layer, the outer layer defining an enclosure. The method further include operating, by the control unit, the extruder to extrude an inner matrix within the enclosure. The outer layer and the inner matrix are formed by depositing successive layers using an additive manufacturing system. The inner matrix is defined by a first layup and a second layup. The first layup is laid along a first direction and across the enclosure. Further, the second layup is laid juxtaposing the first layup. The first layup and the second layup define a plurality of air pockets in the inner matrix. The method further includes operating, by the control unit, an injector to infuse a filler material into at least some air pockets of the plurality of air pockets.

According to a configuration of the third aspect, the method includes defining one or more cavities in the inner matrix. The one or more cavities are defined between the outer layer and one or more inner layers of the construction element.

According to a configuration of the third aspect, the method includes inserting an insert into the one or more cavities. Further, the insert is made of an insulating material.

SUMMARY OF THE INVENTION/EMBODIMENTS

The present disclosure also encompasses embodiments as defined in the following numbered phrases. It should be noted that these numbered embodiments intended to add to this disclosure and is not intended in any way to be limiting.

1. A construction element produced by additive manufacturing process, the construction element comprising: an outer layer defining an enclosure; an inner matrix formed within the enclosure, wherein, the outer layer and the inner matrix are integrally formed by depositing successive layers using an additive manufacturing system, the inner matrix defined by: a first layup laid along a first direction and across the enclosure; a second layup laid juxtaposing the first layup, wherein, the first layup and the second layup define a plurality of air pockets in the inner matrix; and a filler material infused into at least some air pockets of the plurality of air pockets.
2. The construction element of embodiment 1, wherein the outer layer is made of a first material, and the inner matrix is made of a second material, and wherein the outer layer and the inner matrix are integrally formed by depositing successive layers of the first material and the second material.
3. The construction element of embodiment 2, wherein the first material forming the outer layer is same as that of the second material forming the inner matrix.
4. The construction element of embodiment 1, wherein the filler material is different from the material of the outer layer and the inner matrix, and wherein the filler material is made of a third material.
5. The construction element of embodiment 1, wherein the inner matrix is made of material including a blend of clay, plastic particles, and powder carbon particles.
6. The construction element of embodiment 1, wherein the second layup is laid along a second direction, the second direction being different from the first direction and across the enclosure.

7. The construction element of embodiment 6, wherein the first layup and the second layup crisscross each other at an angle in a range of 40 degrees to 50 degrees.
8. The construction element of embodiment 7, wherein the first layup and the second layup crisscross at an angle of substantially 45 degrees.
9. The construction element of embodiment 1, wherein the plurality of air pockets constitutes at least 50 percent of volume of space within the enclosure.
10. The construction element of embodiment 1, wherein the at least some air pockets is infused with filler material form a contour of predetermined shape in the construction element.
11. The construction element of embodiment 1, comprises one or more inner layers, the one or more inner layers having substantially same configuration as that of the outer layer, and wherein the one or more inner layers and the outer layer is configured to define one or more cavities in the inner matrix.
12. The construction element of embodiment 11, wherein at least some of the one or more cavities is configured to receive an insert made of an insulating material.
13. The construction element of embodiment 11, wherein at least some cavities of the one or more cavities are defined proximal to a periphery of the outer layer or proximal to a periphery of the one or more inner layers.
14. The construction element of embodiment 11, wherein at least some cavities of the one or more cavities are defined substantially centrally in the inner matrix and away from a periphery of the outer layer.
15. The construction element of embodiment 11, wherein the one or more cavities are C-shaped, S-shaped, arcuate shaped, semi-circular shaped, and rectangular shaped.
16. The construction element of embodiment 12, wherein the insulating material comprises at least one of a compressed plastic waste and compressed natural fibers.
17. The construction element of embodiment 16, wherein the compressed natural fibers include at least one of dried and milled palm trunk wood, dried palm leaves, date palm tree leaves, crushed date pit, wood, and wherein said compressed natural fibers are compressed by using binders including okra powder along with water.
18. An additive manufacturing system for producing a construction element, the system comprising: an extruder configured to extrude material layer-by-layer for producing the construction element; a sensor module connectable to the extruder, the sensor module being configured to detect one or more predetermined parameters of the construction element; a mechanism engageable with the extruder, the mechanism configured to introduce reinforcement into the construction element and adapted to regulate predetermined characteristics of each layer of the construction element; and a control unit communicatively coupled to the extruder, the sensor module and the mechanism, the control unit configured to: regulate movement of the extruder, based on signals corresponding to the one or more predetermined parameters received from the sensor module; and operate the mechanism, selectively, to regulate introduction of reinforcement into the construction element and to regulate one or more of the predetermined characteristics of the construction element.
19. The additive manufacturing system of embodiment 18, wherein the mechanism comprises: a spool unit configured to selectively introduce a reinforcement member into the construction element; and a swing arm coupled to the spool unit, the swing arm being configured to swing relative to at least one of the extruder and the spool unit, the swing arm comprises: a first rotary element, a second rotary element, and an actuator, wherein, the swing arm is configured to selectively engage one of the first rotary element or the second rotary element with layers of the construction element, to regulate the predetermined characteristics of the construction element.
20. The additive manufacturing system of embodiment 19, wherein the control unit is configured to operate the mechanism by: operating the spool unit to introduce the reinforcement member into a layer of the construction element; and operating the actuator associated with the swing arm to selectively engage one of the first rotary element or the second rotary element with the layer of the construction element, wherein operation of the spool unit and the swing arm is configured to regulate the predetermined characteristics of each layer of the construction element.
21. The additive manufacturing system of embodiment 19, wherein the first rotary element, upon engagement with each layer of the construction element, is configured to traverse over each layer to alter characteristics of a surface each layer.
22. The additive manufacturing system of embodiment 21, wherein the first rotary element is a herringbone gear, and wherein the first rotary element upon traversing over each layer of the construction element, imprints herringbone pattern on the surface of each layer.
23. The additive manufacturing system of embodiment 19, wherein the second rotary element is a flattening wheel, and wherein the second rotary element upon traversing over each layer of the construction element, flattens a surface of each layer.
24. The additive manufacturing system of embodiment 19, wherein the mechanism comprises an injector configured to infuse a filler material into at least some air pockets of a plurality of air pockets defined in the construction element.
25. A method for manufacturing a construction element, the method comprising: operating, by a control unit, an extruder to extrude an outer layer the outer layer defining an enclosure; operating, by the control unit, the extruder to extrude an inner matrix within the enclosure, the outer layer and the inner matrix formed by depositing successive layers using an additive manufacturing system, the inner matrix defined by: a first layup along a first direction and across the enclosure; and a second layup laid juxtaposing the first layup, wherein, the first layup and the second layup define a plurality of air pockets in the inner matrix; and operating, by the control unit, an injector to infuse a filler material into at least some air pockets of the plurality of air pockets.
26. The method of embodiment 25, comprises defining one or more cavities in the inner matrix, the one or more cavities defined between the outer layer and one or more inner layers of the construction element.
27. The method of embodiment 26, comprises inserting an insert into the one or more cavities, and wherein the insert being made of an insulating material.

BRIEF DESCRIPTION OF DRAWINGS

In order to better understand the subject matter that is disclosed herein and to exemplify how it may be carried out in practice, embodiments will now be described, by way of non-limiting examples only, with reference to the accompanying drawings, in which:

FIG. 5b illustrates a top perspective view of the construction element of the FIG. 5a;

FIG. 6b illustrates a top perspective view of the construction element of the FIG. 6a;

DETAILED DESCRIPTION OF EMBODIMENTS

Figure 1:
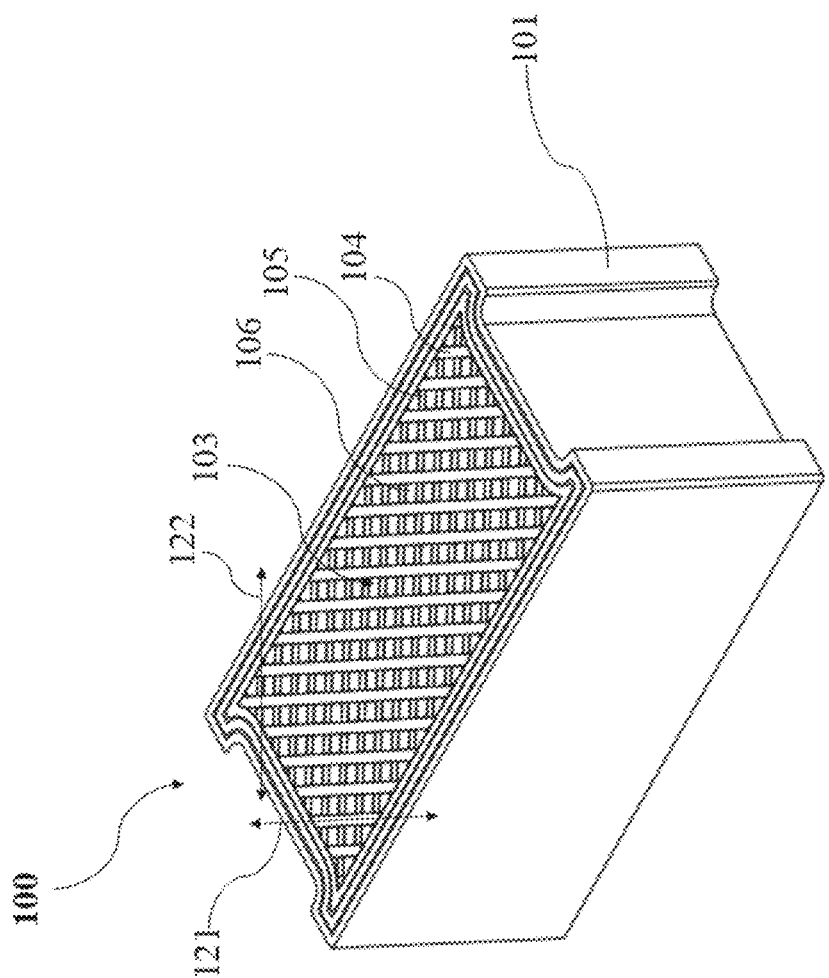
FIG. 1 illustrates a construction element, according to an example of the present disclosure.

FIG. 1 illustrates a construction element 100 [also referred to as the 'element' hereinafter in the present disclosure], in accordance with an exemplary embodiment of the present disclosure. The construction element 100 is produced by additive manufacturing. The term 'additive manufacturing' as used in the present disclosure refers to a process employed to produce a physical object from a three-dimensional [3D] digital model. The process of additive manufacturing is also referred to as 3D printing process or as three-dimensional printing process, and the same is used interchangeably in the present disclosure. The process of additive manufacturing or 3D printing includes laying a plurality of successive layers of materials, to form three dimensional objects in desired shape and form, which herein is referred to as 'construction element'. The term 'construction element' refers to a building block or a unit block that is constructed by additive manufacturing process by laying the plurality of successive layers made from specific material and/or constituents. For instance, for constructional applications such as walls, building portions, partitions, and the like, the 'construction element' can be considered as the building block or the unit block that may be stacked, interlocked, connected, coupled, bonded, and the like with other construction elements to produce such walls, building portions and the like.

Figure 2:
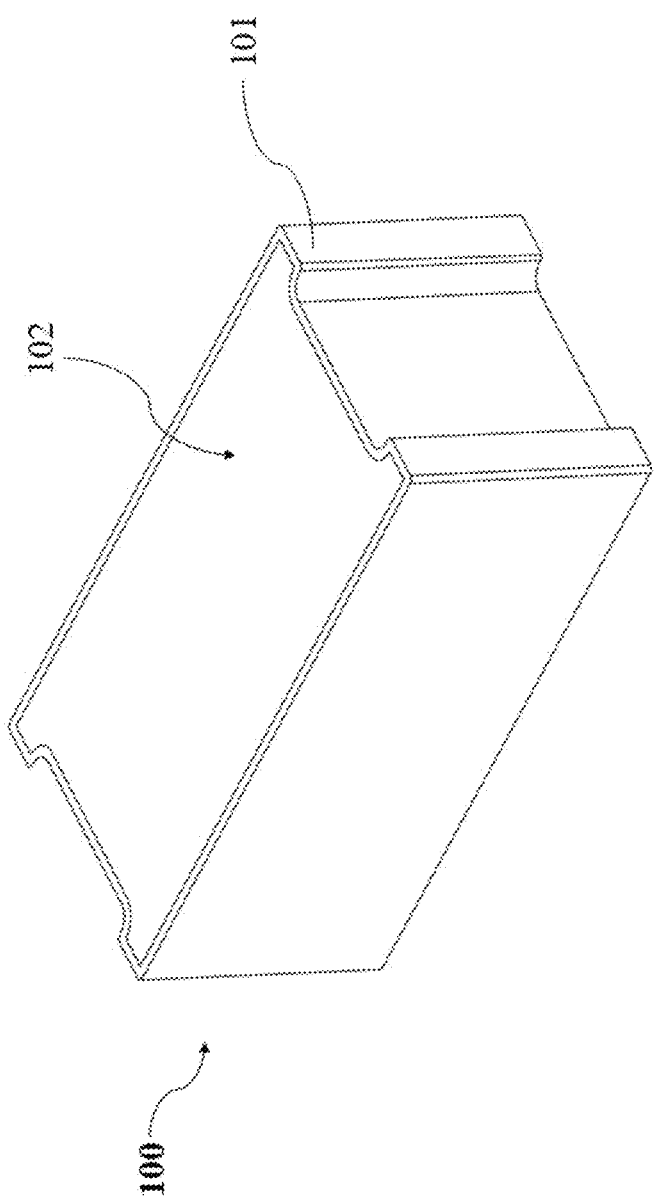
FIG. 2 illustrates an enclosure of the construction element of the FIG. 1.

The construction element 100 includes an outer layer 101 as depicted in the FIG. 1. The outer layer 101 may also be referred to as 'outer wall portion' or 'outer wall' hereinafter. The outer layer 101 is configured to define or form an enclosure 102, as shown in the FIG. 2. In one implementation, the enclosure 102 being defined by the outer layer 101 may be hollow or void space capable of receiving, holding, accommodating and/or storing material. The outer layer 101 may be formed by laying multiple layers of suitable material, where laying of such multiple layers is implemented through an extrusion process. In other words, the outer layer 101, upon extrusion, solidifies and forms a boundary wall for depositing of layers within the outer layer 101. The construction element 100 further includes an inner matrix 103. The inner matrix 103 is formed by extrusion of layers within the enclosure 102. In one implementation, the outer layer 101 and the inner matrix 103 are formed integrally, by depositing successive layers using an additive manufacturing system 200 [shown in FIG. 10]. Alternatively, the outer layer 101 may be extruded before forming the inner matrix 103 by the additive manufacturing system 200. In one implementation, the outer layer 101 may be made of a first material and the inner matrix 103 is made of a second material. The outer layer 101 and the inner matrix 103 may be integrally formed by depositing successive layers of the first material and the second material. In one implementation, the first material forming the outer layer 101 may be same as that of the second material forming the inner matrix 103.

In one implementation, the first material and the second material, though being made from the same material or constituents, may be differentiated based on dimension [such as thickness, width] or solidification rate [i.e., curing time] for producing the outer layer 101 and the inner matrix 103. Further, at least one of the first material and the second material may be made of material including a blend of clay, plastic particles, and powder carbon particles. In one implementation, the plastic particles may be recovered particles from waste such as municipal waste, landfill, industrial waste, and among other sources of plastic particles, while the plastic particles may also be specifically produced polymer pellets employable for extruding the first material for printing the construction element 100. The blend of clay enriched with the plastic particles and the powder carbon particles offer dual benefit such as enhancing structural integrity and thermal insulation capabilities of the construction element 100. In one implementation, constituent proportion of the blend of the clay enriched with the plastic particles and the powder carbon particles may be varied, to achieve an optimal balance between strength and thermal performance, ensuring suitability for the construction element 100 to be employable in various construction requirements. It is to be noted that, material constituents as defined herein for producing the first material and the second material for printing of the construction element 100 is not to be considered as a limitation, rather such material constituents may be adaptably varied to attain desired properties such as strength and thermal insulation for allowing the construction element 100 to be employed across a wide range of construction applications.

Figure 3:
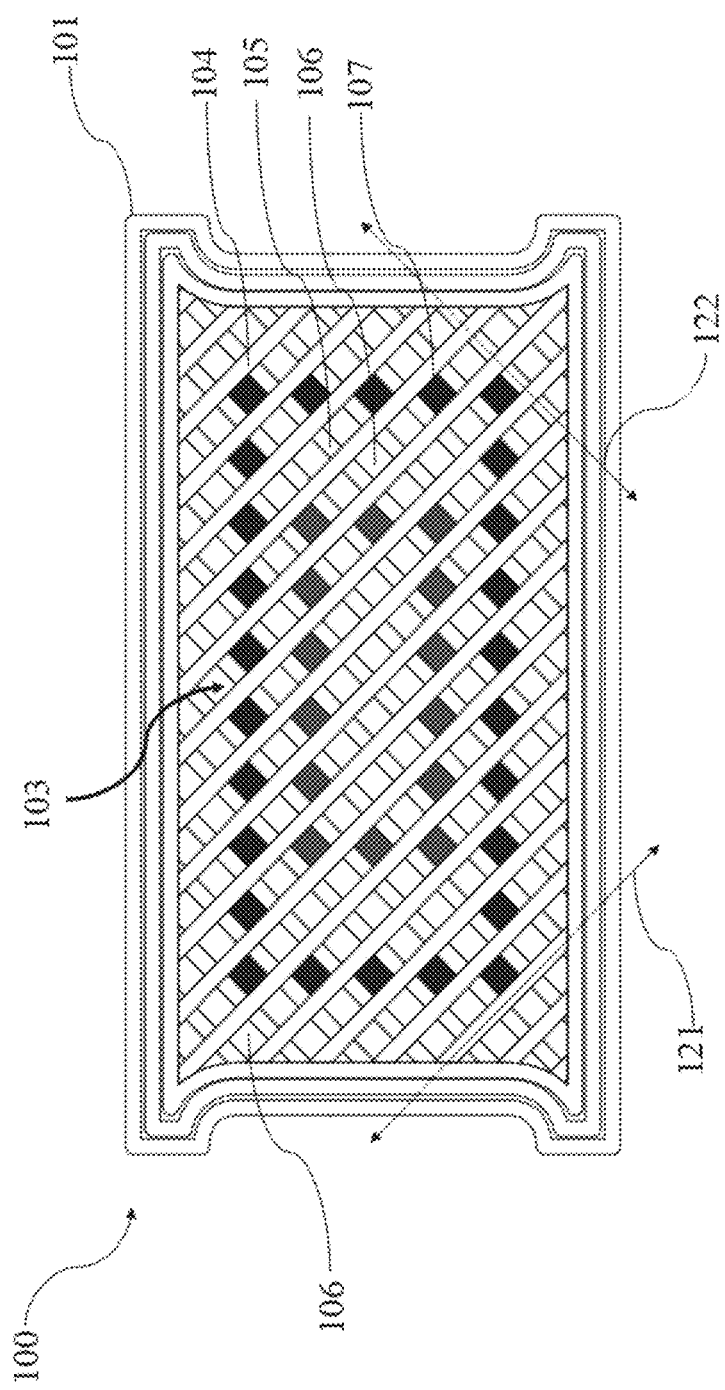
FIG. 3 illustrates a top view of the construction element of the FIG. 1.

FIG. 3 illustrates a top view of the construction element 100. The inner matrix 103 is now described with reference to the FIGS. 1 and 3. The inner matrix 103 is defined by a first layup 104 and a second layup 105 laid over the first layup 104. The first layup 104 is laid along a first direction 121 and across the enclosure 102. The second layup 105 is laid juxtaposing the first layup 104. That is, the second layup 105 may be laid to crossover at least a portion of the first layup 104 during forming of the inner matrix 103. For such configuration, the second layup 105 is laid along a second direction 122 which is different from the first direction 121 along which the first layup 104 is laid. Further, each of the first layup 104 and the second layup 105 are laid across the enclosure 102 defined by the outer layer 101.

In the illustrative embodiment, the first layup 104 and the second layup 105 define a plurality of air pockets 106 in the inner matrix 103, as can be seen in FIG. 3. Each of the plurality of air pockets 106 [also referred to as the 'air pockets 106' hereinafter in the present disclosure] are formed at the intersection of at least two opposing extrusions of the first layup 104 and the second layup 105 during the 3D printing process for producing the inner matrix 103. Formation of the air pockets 106 is a result of a plurality of layers of the first layup 104 and the second layup 105 being extruded at a predefined opposing angles [for instance, the first layup 104 being laid at 45 degrees in a clockwise direction, while the second layup 105 being laid at 45 degrees in a counterclockwise direction], resulting in orientation of such plurality of air pockets 106 being aligned in a defined pattern. In one implementation, the plurality of air pockets 106 may constitute at least 50 percent of volume of space within the enclosure 102. In one implementation, a collective volume of the plurality of air pockets 106 in the construction element 100 volume may configured to be less than 50 percent of volume of space within the enclosure 102, while considering several factors such as the intended application, structural requirements, and thermal insulation requirements among others that affect performance of the construction element 100. Angle between the layups [or the layers of the inner matrix 103] influences structural integrity, stability, and overall quality, of the construction element 100. Alignment of the layups, relative to each other, may be customized to ensure maximum strength and stability. Alignment of the layups, relative to each other, can be varied to produce the air pockets 106 as per requirement. Further, while manufacturing the construction element 100, a total percentage volume of the air pockets 106 [as a percentage of an entire volume of the construction element 100] can be specified, before initiating the 3D printing process. Based on such specified percentage of air pocket volume, shape of the air pockets 106 is determined. The shape of the air pockets 106 to be formed is determined by considering parameters such as but not limited to, infill pattern shape and specified percentage of the air pocket volume.

In one implementation, the first layup 104 and the second layup 105 may crisscross each other at an angle in a range of 40 degrees to 50 degrees. Accordingly, the air pockets 106 are formed at intersections of the layups. In the illustrative embodiments of the FIGS. 1 and 3, the first layup 104 and the second layup 105 crisscross at an angle of substantially 45 degrees [referred to as the 'relative angle of extrusion']. The term 'substantially' as used in the present disclosure refers to the magnitude of one quantity which is equal to, slightly lesser or slightly greater than the magnitude of other quantity that is considered for comparison. For instance, the term "substantially" in phrase 'substantially 45 degrees' refers to the angle being approximately 45 degrees, while not being perfectly 45 degrees. Further, the same assertion applies mutatis mutandis to the rest of the phrases consisting the term "substantially". The relative angle of extrusion of 45 degrees between the successive layups [i.e., between the first layup 104 and the second layup 105] of the inner matrix 103 may be customized to maintain strength balance of each layup when being extruded along a height and a width of the construction element 100. The relative angle of extrusion between the layups may be customized based on the design requirements and structural considerations.

Referring to the FIGS. 1 and 3, the construction element 100 is configured to provide a predetermined thermal resistance. The thermal resistance can be defined as a measurement of resistance to heat transfer along thickness-to-thermal conductivity ratio. The thermal resistance is an inverse of thermal conductance. The thermal resistance of the construction element 100 is based on parameters including material, thickness, area, and geometry, of the outer wall and the inner matrix 103, and volume percentage defined by the plurality of air pockets 106 in the construction element 100.

The thermal resistance of the construction element 100 may be considered as, for instance, a summation of thermal resistance of the outer wall, thermal resistance of the inner matrix 103, thermal resistance of the air pockets 106, and the thermal resistance of the filler material 107. Accordingly, in order to evaluate overall thermal insulation of the construction element 100, it would be required to evaluate contribution of said factors individually, rather than adhering to a predetermined range of thermal insulation. In addition, by customizing said factors, thermal insulation properties of the construction element 100 can be tailored to meet specific requirements and environmental conditions of intended application.

Referring to FIG. 3 again, the construction element 100 also includes a filler material 107 infused into at least some air pockets 106 of the plurality of air pockets 106. The air pockets 106 that are infused with the filler material 107 are depicted as shaded air pockets 106 in the FIG. 3. Such air pockets 106 infused with filler material 107, form a contour of predetermined shape in the construction element 100. In the illustrated embodiment of the FIG. 3, the air pockets 106 form a rectangular contour. It can be seen that the air pockets 106 form a first contour 132 [inner contour; of substantially rectangular shape] at a central region of the construction element 100, and a second contour 131 [outer contour; of substantially rectangular shape] around the first contour 132 and proximal to the outer layer 101. In one implementation, the filler material 107 may be different from the material of the outer layer 101 and the inner matrix 103. Further, the filler material 107 may be made of a third material that is different from the first material and the second material of the outer layer 101 and the inner matrix 103, respectively. The filler material 107 may be a foam or a synthetic foam. The filler material 107 may be chosen such that the material improves thermal resistance of the construction element 100. A thermal resistance of the construction element 100 depicted in FIGS. 1 and 3, is described in the following paragraphs.

Figure 4A:
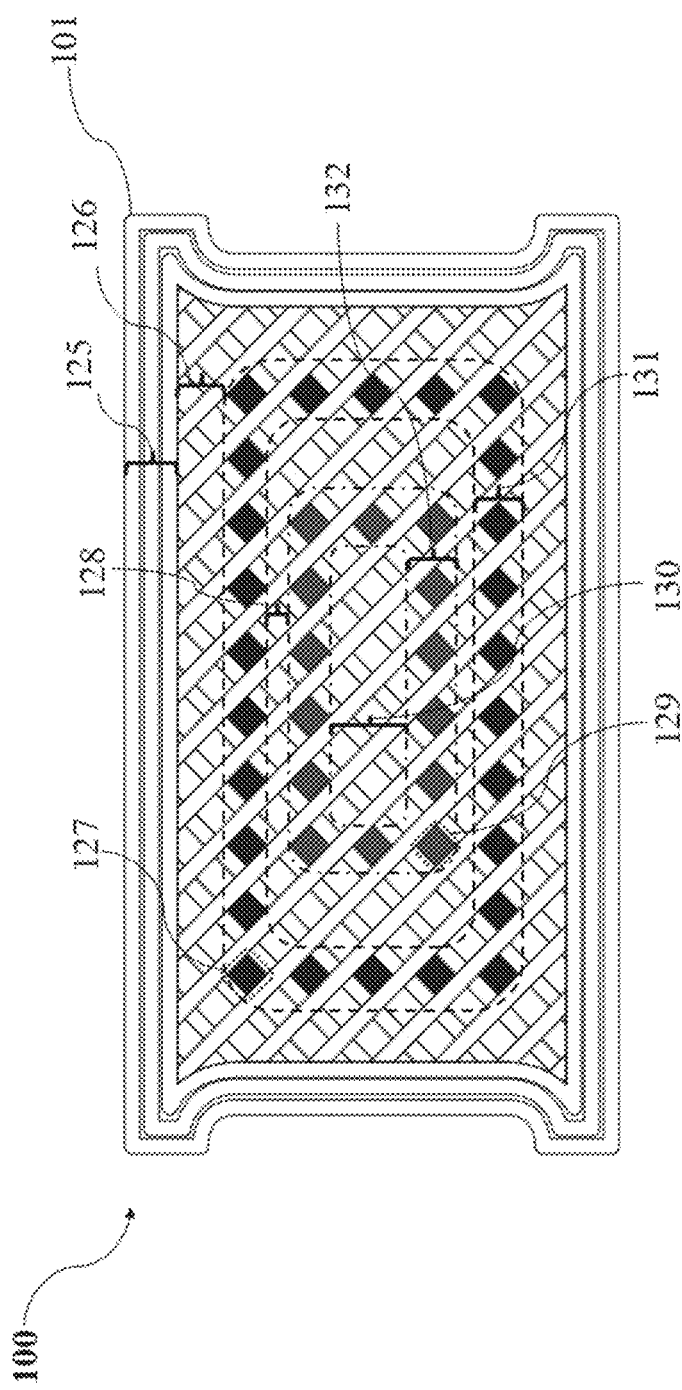
FIG. 4a illustrates another top perspective view of the construction element of the FIG. 1, and illustrates thermal resistances of various regions of the construction element.
Figure 4B:
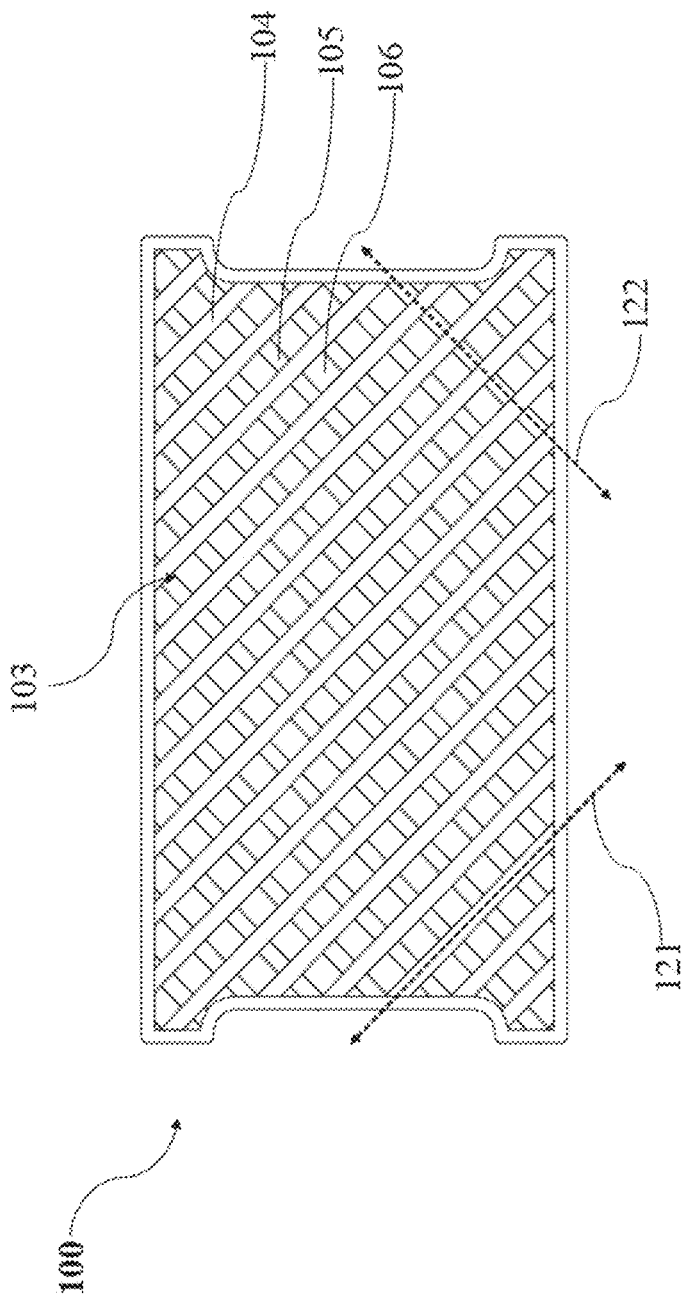
FIG. 4b illustrates another top perspective view of the construction element of the FIG. 1, including an outer layer comprising of only one layer.

FIG. 4a illustrates the construction element 100, indicating thermal resistances of various regions of the construction element 100. Thermal resistance of the outer layer 101 is designated as TR1 and the same is denoted by the numeral '125' in the FIG. 4a. It is to be understood that while the outer layer 101 is depicted as having three number of layers in the FIG. 4a, the outer layer 101 may comprise of only one layer, as depicted in the construction element 100 of FIG. 4b. In one implementation, the outer layer 101 may have at least one number of layer and may comprise of more than one layer. The thermal insulation TR1 is calculated based on type of material used for constructing the outer layer 101 and thickness of the outer layer 101. Further, thermal resistance of the inner matrix 103 and the plurality of air pockets 106 positioned between the outer layer 101 and the first contour 132 is designated as TR2, and the same is denoted by the numeral '126'.

As illustrated in the FIGS. 3 and 4, the air pockets 106 are rhombus shaped. The air pockets 106 adjacent to the outer wall are triangular shaped. The thermal insulation 'TR2' of the Rhombus or triangular shape air pocket is calculated by considering a projected area of region encompassing the inner matrix 103 and the plurality of air pockets 106, that are positioned between the outer layer 101 and the first contour 132. Here, it is to be understood that while the air pockets 106 shown in the Figures are either rhombus shaped or triangular shaped, the air pockets 106 can also be of any other shape. The air pockets 106 could be square shaped, rectangular shaped and the like. Further, an effectiveness of the thermal resistance TR2 is influenced by (i) geometry of the rhombus shaped or the triangular shaped air pockets 106; and (ii) spacing between individual air pockets 106. Additionally, factors such as material properties and thickness of the first layup 104 and the second layup 105 further contribute to overall thermal resistance of the construction element 100.

Referring again to the FIG. 4a, the construction element 100 further includes thermal resistance zones/regions designated as TR3, TR4, TR5 and TR6. The thermal resistance regions TR3, TR4, TR5 and TR6 are denoted by reference numerals 127, 128, 129 and 130, respectively. The thermal resistance 'TR3', denoted by reference numeral 127, refers to thermal resistance of the air pockets 106 forming the second contour 131, that are infused with the filler material 107. The thermal resistance 'TR4', denoted by reference numeral 128, refers to thermal resistance of air pockets 106 lying between the first contour 132 and the second contour 131. The thermal resistance 'TR5', denoted by reference numeral 129, refers to thermal resistance of air pockets 106 forming the first contour 132, that are infused with the filler material 107. The thermal resistance 'TR6', denoted by reference numeral 130, refers to thermal resistance of air pockets 106 of the inner core i.e., the air pockets 106 lying within the first contour 132. As described above, overall thermal insulation of the construction element 100 can be determined by taking reciprocal of total thermal resistance for multiple layers or materials in series, in the construction element 100. Further, shape, geometry, and percentage of air pocket volume influence overall thermal resistance of the construction element 100.

Figure 5A:
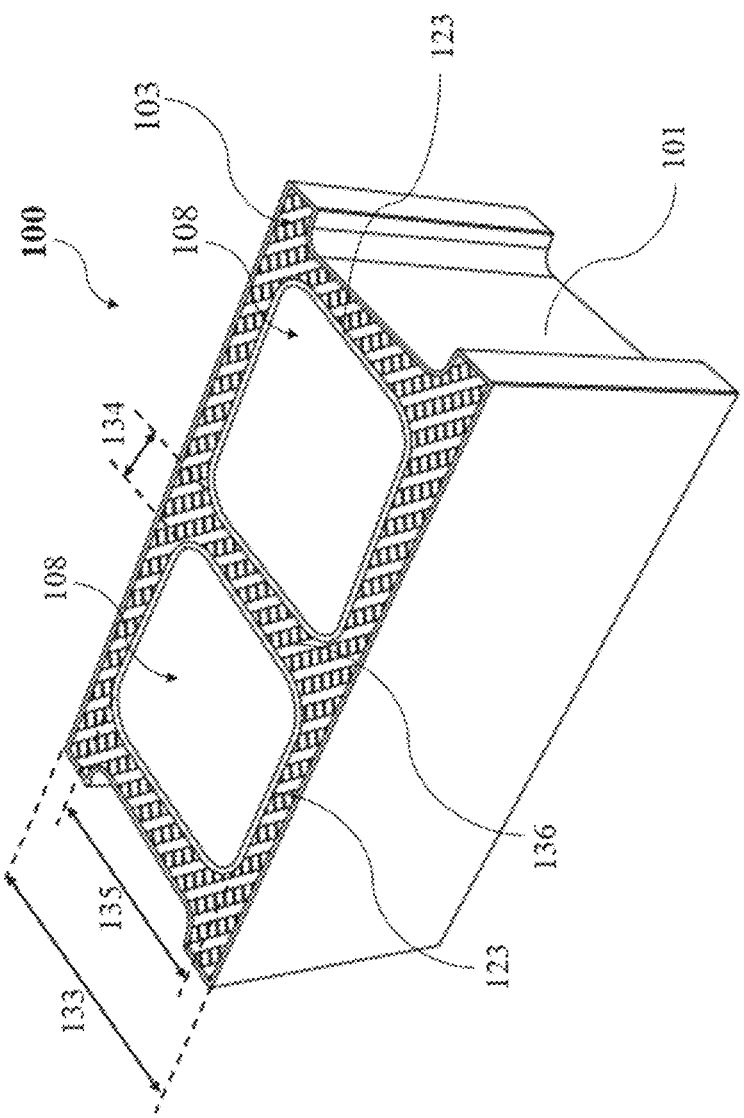
FIG. 5a illustrates a construction element, according to another example of the present disclosure.
Figure 5B:
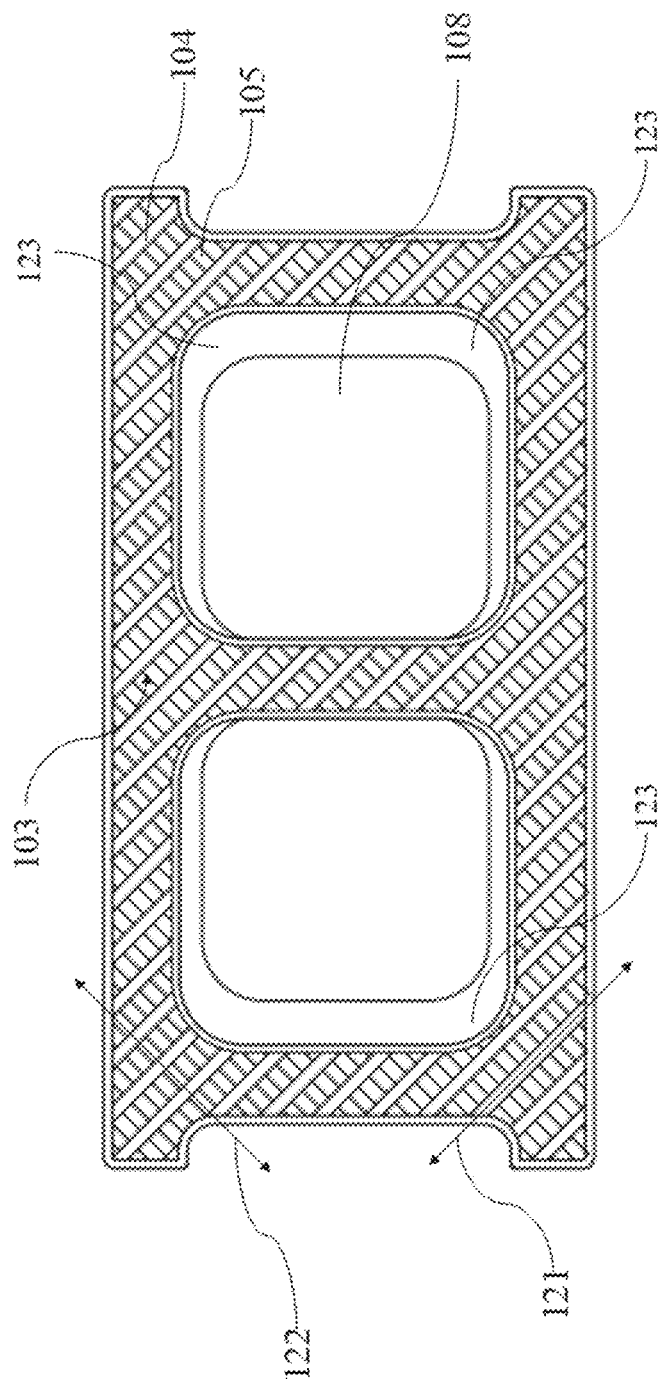

FIGS. 5a and 5b illustrate the construction element 100 in accordance with another exemplary embodiment of the present disclosure. The construction element 100 includes one or more inner layers 123. The inner layers 123 may also be referred to as 'inner walls' hereinafter. The inner walls are formed at an inner portion of the enclosure 102, where such inner walls are positioned inwardly relative to the outer walls. The one or more inner layers 123 have substantially same configuration as that of the outer layer 101. The one or more inner layers 123 and the outer layer 101 are configured to define one or more cavities 108 in the inner matrix 103. As can be seen from FIG. 5, a width 135 of the one or more cavities 108 [also referred to as the 'cavity 108'] may be around 70% of a width 133 of the construction element 100. Further, it is to be understood that the width 135 of the one or more cavities 108 as described above is not be considered as a limitation, and can be caried based on requirements. Further, a web 136 [the section positioned between the cavities 108 of the construction element 100], representing distance between the side-by-side cavities 108, may be configured to have a width 134 of around 15% of the width 133 of the construction element 100. The dimensions, such as the width of the cavity 108 and the width of the web 136 may be customized to ensure structural integrity of the construction element 100, without compromising strength characteristics of the construction element 100.

Continuing our reference to the FIG. 5, an overall thermal resistance of the construction element 100, is determined by the following equation:

$$\text{Total thermal resistance} = 2 \times TR1 + TR2 \qquad 1$$

The term 'TR1' in the above equation represents thermal resistance of a section of the construction element 100 including the outer layer 101 and the air pockets 106, while excluding thermal resistance of the cavities 108. The term 'TR2' in the above equation denotes thermal resistance of two cavities 108 defined in the construction element 100.

Figure 6A:
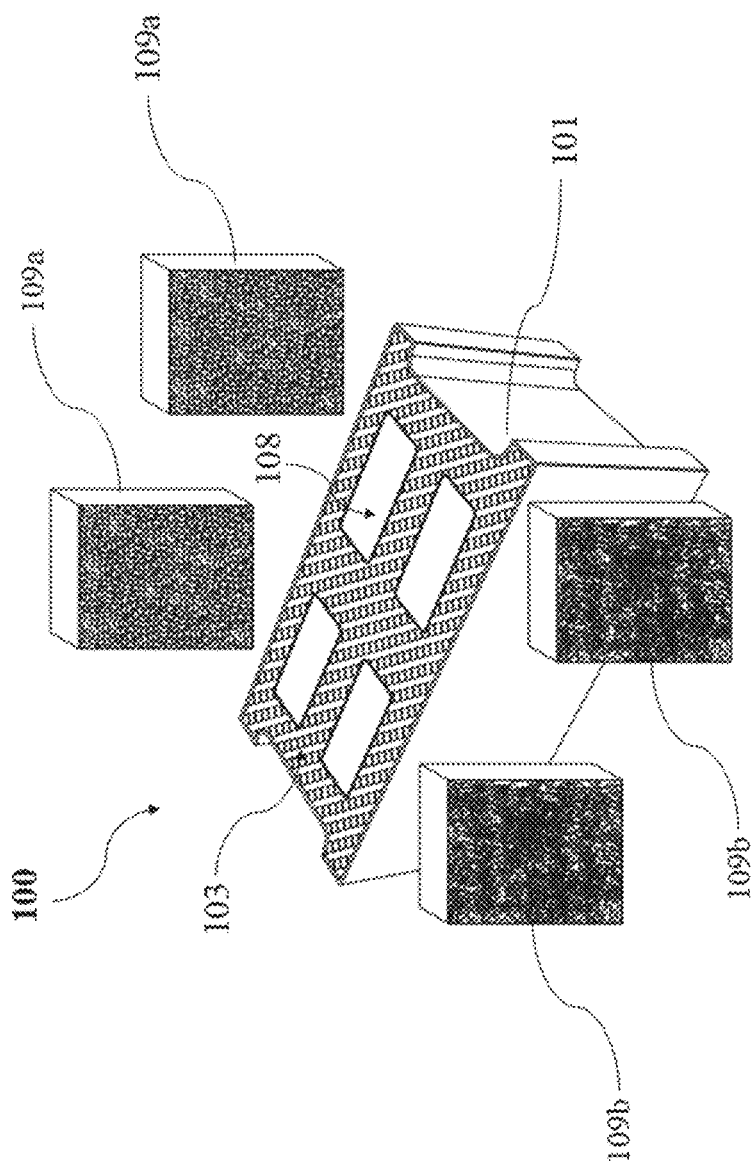
FIG. 6a illustrates a construction element, according to yet another example of the present disclosure.
Figure 6B:
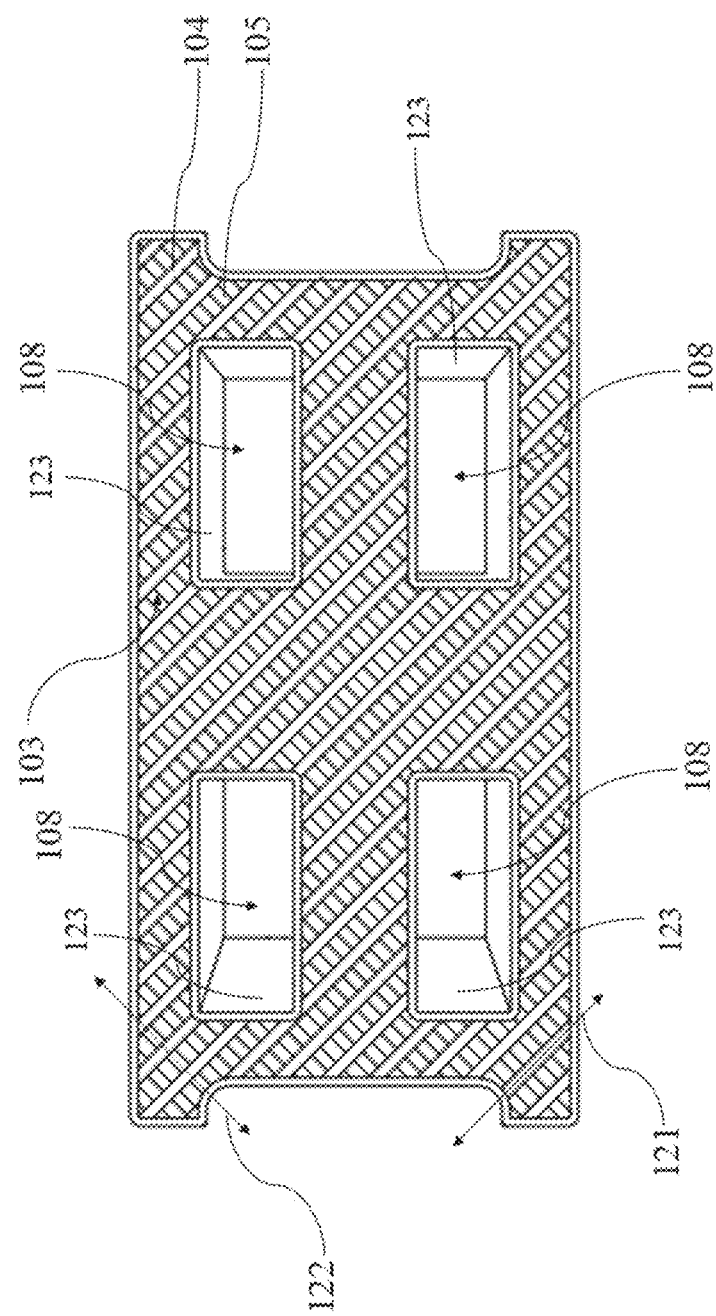
Figure 7A:
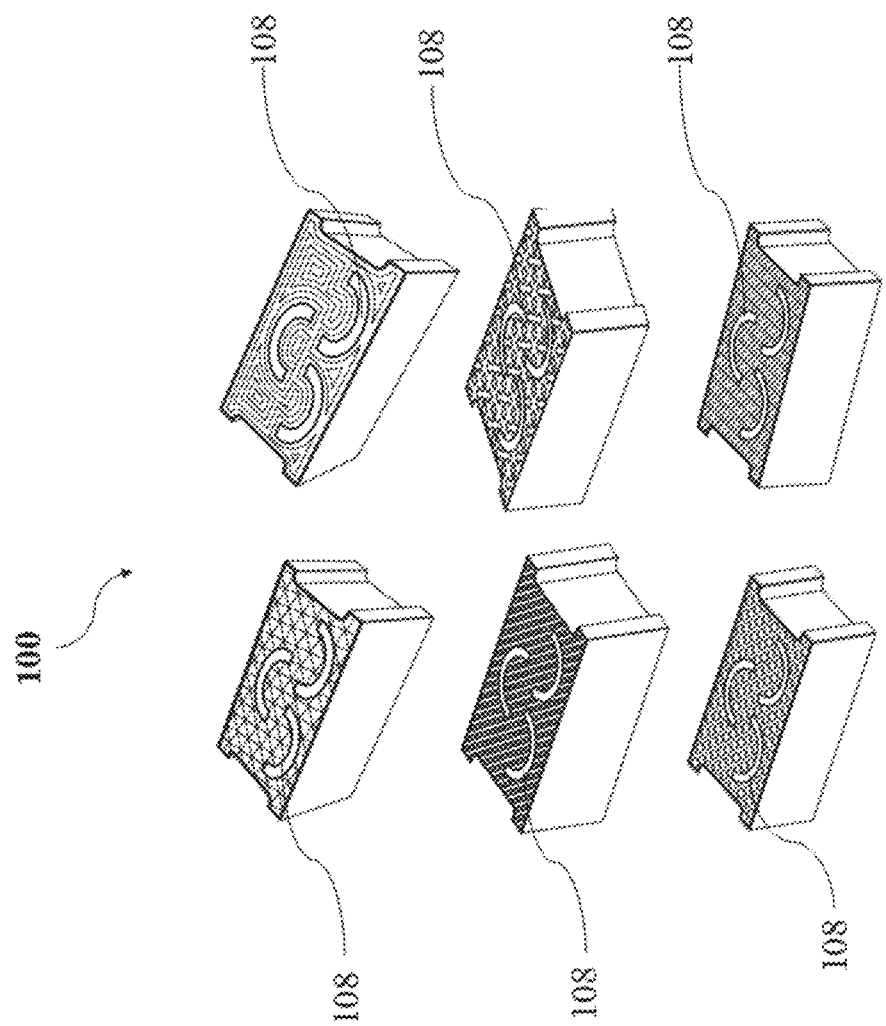
FIGS. 7a to 7d illustrate various implementations of the construction element of the present disclosure.
Figure 7B:
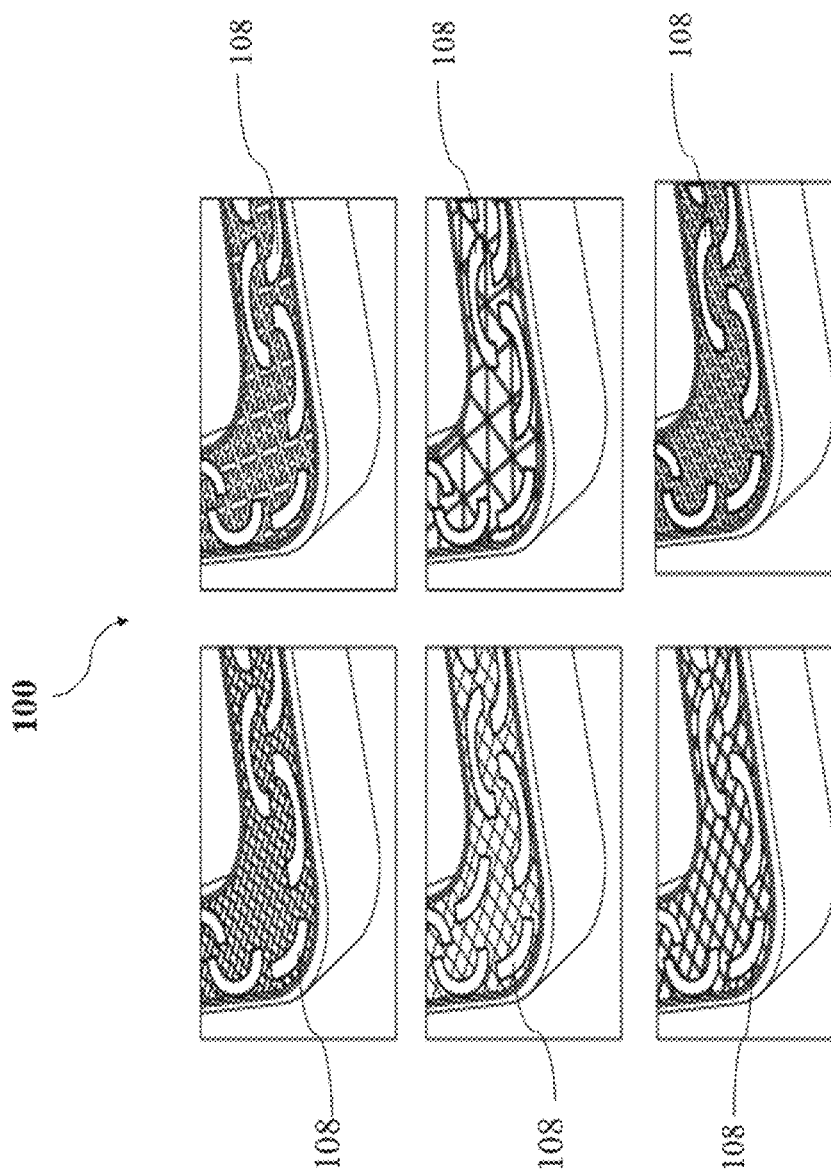
Figure 7C:
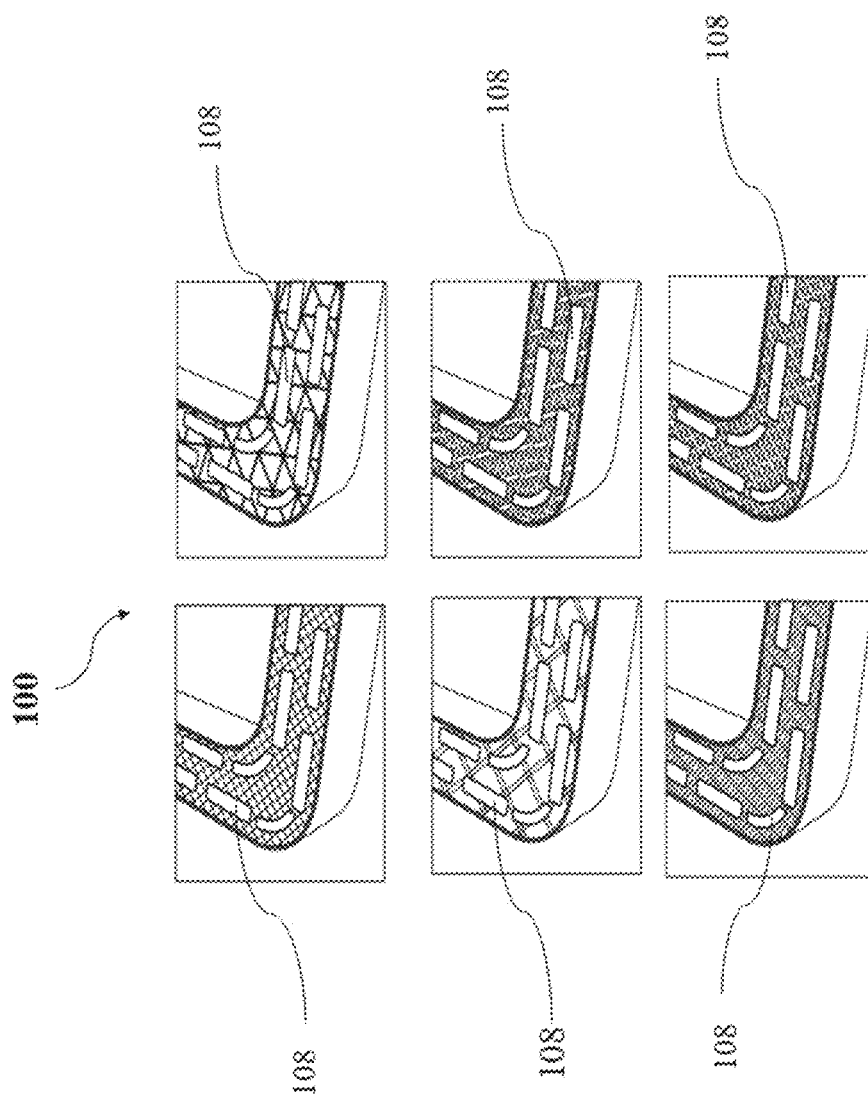
Figure 7D:
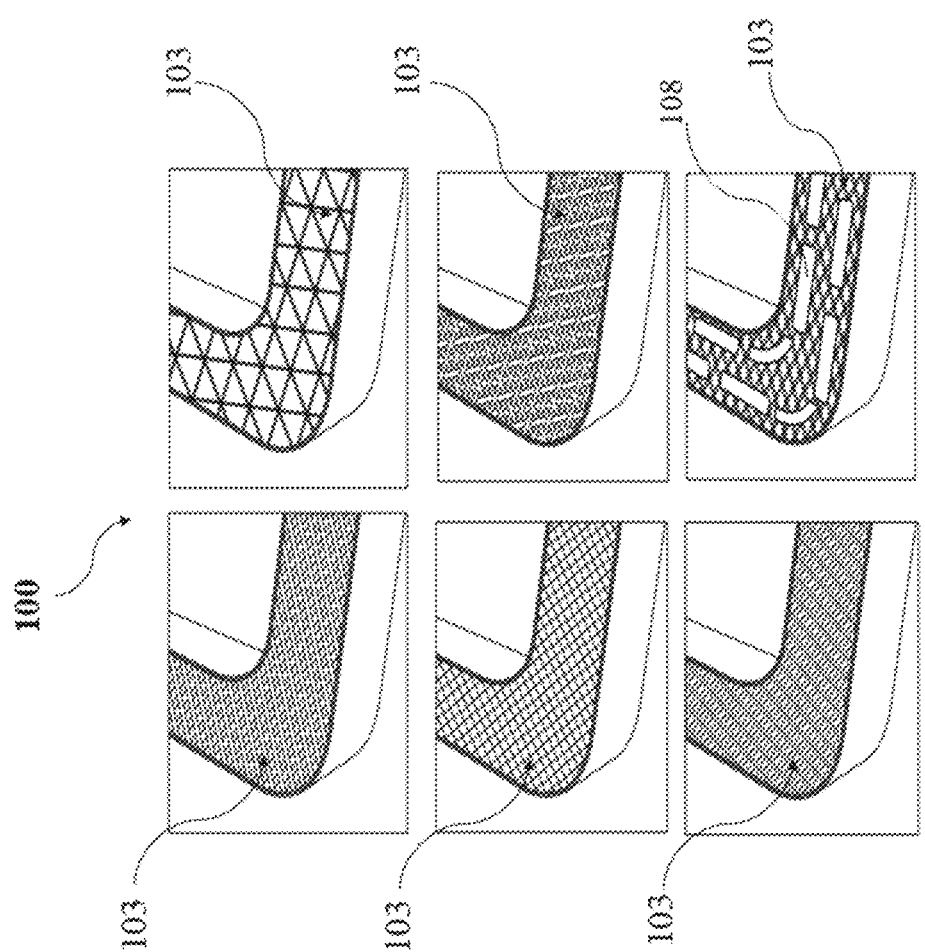

FIGS. 6a and 6b illustrate the construction element 100 in accordance with one implementation of the present disclosure. The construction element 100 is depicted with four number of cavities 108, where such cavities 108 are delimited by the inner layers 123. At least some of the one or more cavities 108 is configured to receive an insert 109 made from an insulating material. The insulating material comprises at least one of a compressed plastic waste and compressed natural fibers. The compressed natural fibers include at least one of dried and milled palm trunk wood, dried palm leaves, date palm tree leaves, crushed date pit and wood. The said compressed natural fibers are compressed by using binders including okra powder along with water. The inserts 109 can be customized according to specific requirements, use, and cost requirements. A sequence of inserts 109 can be flexibly rearranged, allowing for versatile configurations. The inserts 109 may also be made of identical materials, while also providing further customization possibilities. FIGS. 7a through 7d illustrate various implementations of the construction element 100. As illustrated in the FIGS. 7a to 7d, at least one cavity 108 of the one or more cavities 108 is defined proximal to a periphery of the outer layer 101, while at least one cavity 108 of the one or more cavities 108 is defined proximal to a periphery of the one or more inner layers 123. Further, in some implementations, at least one cavity 108 of the one or more cavities 108 is defined substantially centrally in the inner matrix 103 and away from a periphery of the outer layer 101. As can be seen in the FIGS. 7a to 7d, the one or more cavities 108 may be configured to have shape such as, but not limited to, C-shaped, S-shaped, arcuate shaped, semi-circular shaped, and rectangular shaped.

Figure 8:
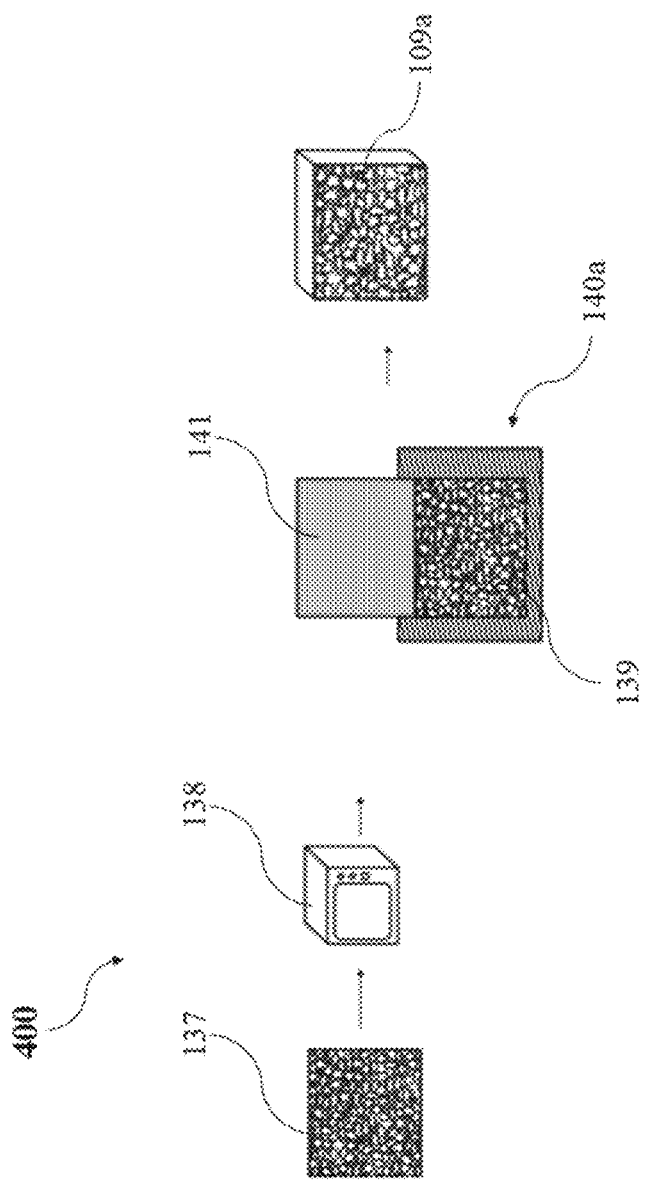
FIG. 8 illustrates an exemplary setup for a process of manufacturing compressed plastic waste inserts.

Referring back to FIG. 6a, the inserts 109 made of compressed plastic waste referred to as '109a', are produced through a process including drying assorted shredded plastic waste. A process 400 of manufacturing compressed plastic waste inserts 109a is shown in FIG. 8. The processing of the plastic waste insert 109a includes the sorting of plastic waste, denoted by reference numeral '137', followed by shredding the sorted plastic waste. The process 400 may also include conveying the shredded plastic waste in an extruding equipment 144 [shown in FIG. 9] for thorough mixing and uniform distribution of fibers and binders in the plastic waste. The process 400 further includes heat treating the shredded plastic waste in a dryer 138. Thereafter, the heat-treated plastic waste is blended with fibers and binders, where during such blending forms air pockets in the heat-treated plastic waste. The process 400 may additionally include compressing or compacting the heat-treated plastic waste [denoted by reference numeral '139'] by employing a heated mold 140a and a ram 141, to produce inserts 109. The dried plastic waste undergoes compression within the heated mold 140a, reaching a level that preserves the pockets of air formed earlier during blending between the plastic shreds.

With regards to contents of the plastic waste, in an implementation, the plastic waste employed for the process 400 may be derived from shredded, unsorted plastic waste. As it can be understood, any suitable plastic waste can be used for process 400.

Figure 9:
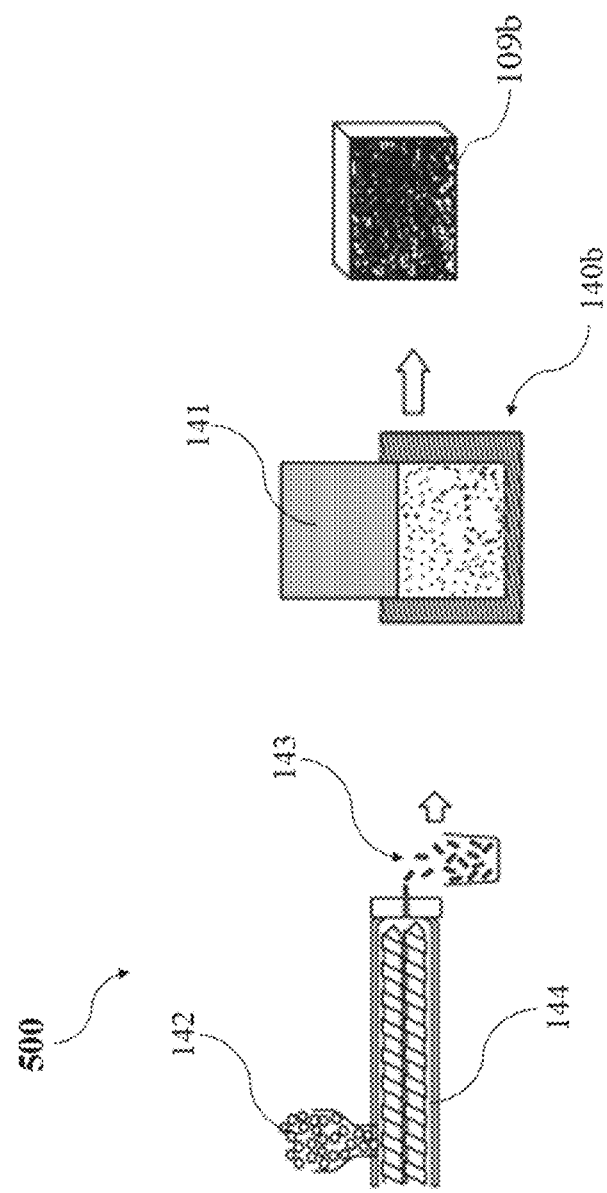
FIG. 9 illustrates an exemplary setup for a process of manufacturing of compressed natural fiber inserts.

In one implementation, during drying stage, the plastic waste is subjected to temperatures of 180° F. for a duration of 1 hour. Subsequently, the temperature is raised to 212° F. for an additional 15 minutes, facilitating compression of the waste to 50% of its original shredded volume by a press or ram 141. The temperature and pressure parameters indicated above can be customized based on the type of plastic waste employed, and to suit the objective of reducing the plastic waste volume to 50% of its original volume. Such compression of the plastic waste ensures that the final product i.e., the plastic waste insert 109a, to defined by a desired volume while incorporating air within the compressed material. Such intentional incorporation of air pockets enhances thermal insulation properties of the plastic waste insert 109a, while optimizing its weight. Such compression process is configured to provide an ideal balance between insulation efficiency and overall product weight. The natural fiber inserts denoted by reference numeral '109b' may also be manufactured by a similar process employed for manufacturing of plastic waste insert 109a, however, with some modifications as will be described hereinafter. FIG. 9 illustrates a process 500 for manufacturing of compressed natural fiber inserts 109b, in accordance with an example of the present disclosure. The process 500 includes amalgamating a mixture 142 of plastic waste particles [in a predetermined proportion] and a first natural fiber [again, in a predetermined proportion], in the extruding equipment 144 to form composite pellets 143. In one implementation, the plastic waste particles may constitute 70% of the mixture 142, while the rest 30% may be constituted by first natural fiber particles. The first natural fiber particles may be dried and milled palm trunk wood. The extruding equipment 144 may be a twin-screw extruding equipment configured to form composite pellets 143. The process 500 further includes mixing of the composite pellets 143 with a second natural fiber in a predetermined proportion. The second natural fiber may be dried palm leaves. The process 500 further includes compressing the mixture of composite pellets 143 and the second natural fiber to form the natural fiber inserts 109b in required shape and form. The composite pellets 143 may be mixed with dried palm leaves in a proportion of 40% and 60%, respectively, and is pressed in a compression mold 140b to form natural fiber inserts 109b. The natural fiber inserts 109b may be rectangular shaped. However, the natural fiber inserts 109b can be customized to any shape to correspond to shape of the cavity 108 in which it is to be inserted. Further, in one implementation, shape and size of the inserts 109a and 109b may be customized for required thermal resistance.

In one implementation, manufacturing natural fiber inserts 109b includes a process of drying and shredding the natural fibers, which are then combined with a binder. The mixture of natural fibers and binders is then extruded in the extruding equipment 144, such as a twin-screw extruding equipment 144, resulting in formation of composite pellets 143 that embody the properties of the natural fibers and binder combination. The extruding equipment 144 rotating screws ensure thorough mixing, resulting in a uniform distribution of the natural fibers. The process 500 parameters for the extruding equipment 144 such as, but not limited to pressure, temperature, screw speed and the like are customizable to suit the material used for producing natural fiber inserts 109b, and to suit the dimensions [i.e., length, width, depth] of the natural fiber insert 109b required to be produced. The process 500 parameters for compression molding, such as, but not limited to pressure, temperature and the like are customized to suit the material used for producing natural fiber inserts 109b, and to suit the dimensions [i.e., length, width, depth] of the natural fiber insert 109b required to be produced. In an example implementation of the process 500, the extruding equipment 144 may be configured to operate at a speed of 10 RPM, while maintaining a temperature range typically between 400° F. The temperature of the extruding equipment 144 can be adjusted based on the specific type of plastic waste being processed. The plastic waste used in the process 500 may contain approximately 10% fiber content, which may be employed for producing composite pellets 143. The composite pellets 143 serve as the foundational material for subsequent stages of production of the natural fiber inserts 109b. During extrusion, the plastic waste is melted and blended with the added fibers. Once produced, the composite pellets 143 act as a binder material for fiber inserts. These fiber inserts are created by combining the composite pellets 143 with fiber waste. The composite pellets 143 serve as a binding agent for holding the fiber waste together and providing structural integrity to the natural fiber inserts 109b. The composite pellets 143 are further processed for improved integrity of the natural fiber inserts 109b. The composite pellets 143 are combined with a predetermined quantity of dried fiber waste at a designated temperature of 200° F., with a fiber content of 10%. Such blending process ensures thorough integration of the pellets with the fiber waste, whereby effectively utilizing the composite pellets 143 as the binding agent. The mixture is compressed to fabricate the natural fiber inserts 109b. During compression, the composite pellets 143 act as the binding agent, to adhere the fibers together and impart cohesion to the natural fiber inserts 109b.

In one implementation, the natural fibers [both the first natural fiber and/or the second natural fiber] are dried and shredded prior to the extrusion process. The plastic waste is melted and blended by heaters beside the extruding equipment 144 with fibers during extrusion. The plastic waste is also added with the natural fibers and binders, so the plastic waste is made of assorted plastic waste. The type of natural fiber may include date palm tree leaf, crushed date pit, and wood. The types of binder and natural fibers may also include okra powder with water.

Referring again to the construction element 100 of FIGS. 6a and 6b, determining overall thermal resistance of the construction element 100 involves summation of five distinct thermal resistances:

$$\text{Total thermal resistance} = 2\chi TR1 + TR2 + TR3 + TR4 \qquad 2$$

In the above equation, TR1 signifies thermal resistance of a section of air pockets 106 around at the outer layer 101 of the construction element 100. TR2 represents thermal resistance of the natural fiber inserts 109b. Further, TR3 corresponds the thermal resistance of air pocket segments located between the cavities 108. TR4 corresponds to thermal resistance of the plastic waste insert 109a. Such comprehensive calculation accounts for the diverse thermal characteristics of the various elements within the 2-construction element 100 of FIGS. 6a and 6b. A thermal insulation performance of the construction element 100 depends on factors such as material type, volume of air pockets 106, outer layer 101 thickness, and inner layer thickness. In case the air pockets 106 are filled with insulation materials, the same would also have to be taken into account for determining thermal insulation. Different materials have different insulation values and thermal conductivity values and densities of such material influence overall thermal resistance of the construction element 100. In addition, the above-described approach facilitates selecting the most suitable insulation materials tailored to the applicational requirements and environmental conditions. The air pockets 106 may be filled with filler materials such as, but not limited to, foam. The air pockets 106 may be filled with filler materials that are innovative eco-friendly alternatives, such as, but not limited to synthetic foam. Materials influencing thermal resistance are chosen to provide energy efficiency and occupant comfort within the constructed environment, constructed by employing construction element 100. Overall thermal resistance of the construction element 100 is intricately influenced by the interplay of its shape, geometry, and percentage of pockets, alongside the type of insulation material [filler material 107] used and the overall dimensions selected. Cooperatively, these factors influence thermal performance and efficiency of the construction element 100 and determining their use as sustainable construction elements 100 with efficient insulation properties.

In construction applications, the construction elements 100 shown in FIGS. 1, 5a and 6a can be used in any combination, based on load-bearing requirements of the construction element 100. The combination of the construction elements 100 to be employed can be based on factors such as, but not limited to, external appearance required, internal partitions required, and insulation requirements of floor slabs, walls, roofs and the like. The construction element 100 can be considered as equivalent and/or a replacement to a brick used in constructions. The construction elements 100 of the present disclosure have life-cycle costs that are practical and competitive compared to conventional elements used in the construction of building and structures. The plurality of air pockets 106 of the construction element 100 are configured to enhance insulation properties, by offering a means to infuse insulation material along a desired path. The plurality of air pockets 106 may also be utilized to facilitate circulation of warm or cold air for heating or cooling of the construction element 100, and in turn for heating or cooling the 3D printed object formed by the construction element 100. Such integration of the air pockets 106 not only optimizes structural efficiency but also expands functionality of printed structural elements, whereby allowing for enhanced thermal regulation and energy efficiency.

Figure 10:
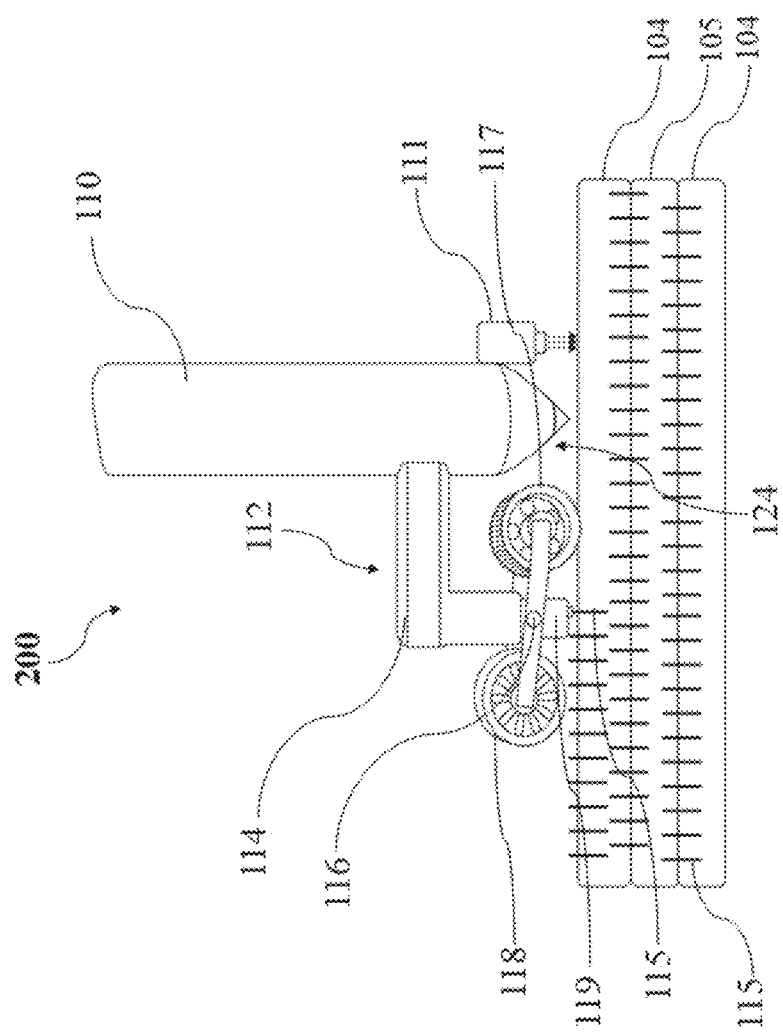
FIGS. 10, 11 and 12, illustrate an additive manufacturing system, in accordance with an example of the present disclosure.
Figure 11:
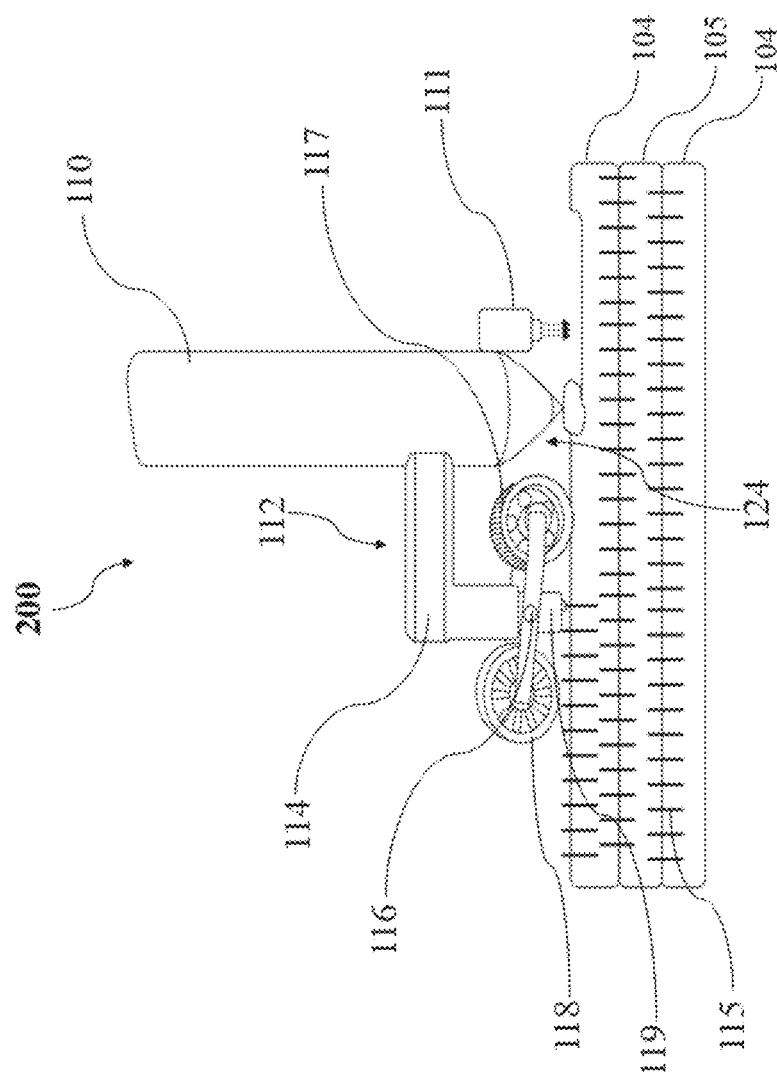
Figure 12:
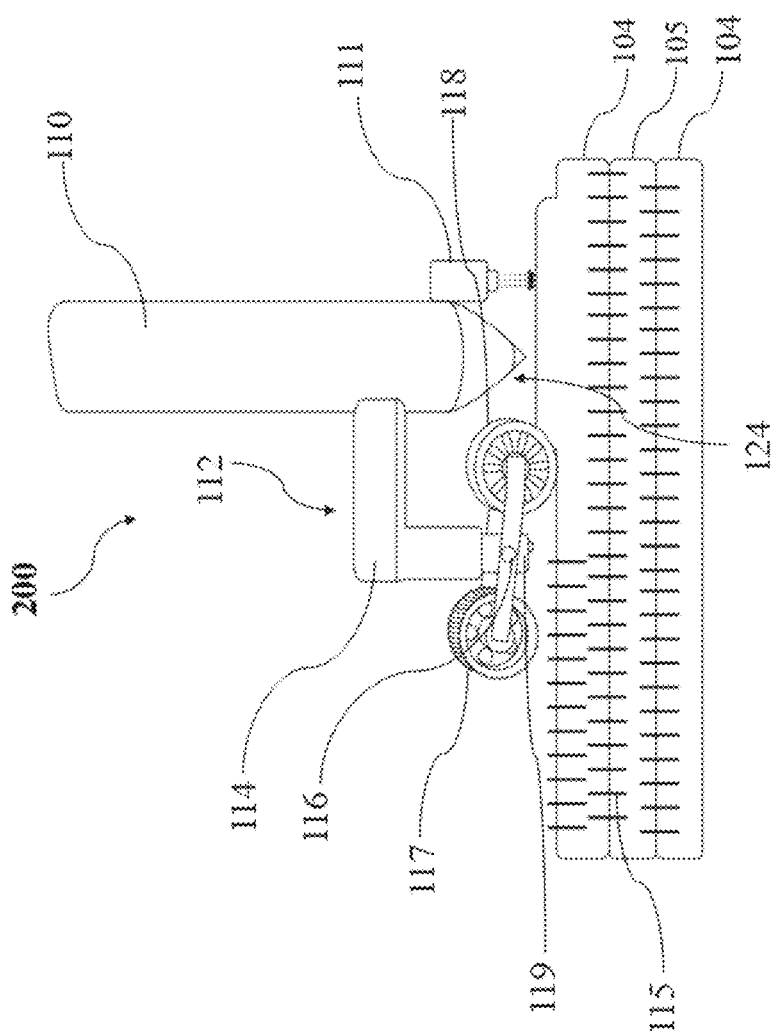

FIGS. 10, 11 and 12, illustrate an additive manufacturing system 200 [also referred to as the 'system' hereinafter in the present disclosure], in accordance with an exemplary implementation of the present disclosure. The system 200 is configured to produce the construction element 100, by additive manufacturing.

Attention is now directed to FIG. 10, illustrating the system 200. The system 200 includes an extruder 110. The extruder 110 is configured to discharge material to form the construction element 100. The extruder 110 may be configured to discharge material to form successive layers, where such successive layers are deposited within a predefined volume [also known as '3D printing volume]. The extruder 110 of the present disclosure is configured to extrude or discharge material successively and on layer-by-layer approach, for producing the construction element 100. The extruder 110 may also be referred to as a 'main extruder 110'. Accordingly, in some implementations, the system 200 may have more than one extruder 110, including the main extruder 110 and one or more additional extruders. The extruder 110 may be configured to discharge the material at a predetermined flow rate such that, the discharged material gets laid in a defined pattern as transversed by the extruder 110, to form the construction element 100. The extruder 110 may be coupled to a nozzle 124 at a lower portion thereof, to extrude the material at the predetermined flow rate and in defined pattern.

The system 200 further includes a sensor module 111. The sensor module 111 may be configured to be connectable to the extruder 110. As illustrated in the illustrative embodiments of FIGS. 10 to 12, the sensor module 111 may be coupled to the lower portion the extruder 110 [i.e., proximal to section of the extruder 110 through which the material is discharged]. In another implementation, the sensor module 111 may be coupled to other portions of the extruder 110. In the illustrative embodiments of the FIGS. 10 to 12, the sensor module 111 may include a proximity sensor. The sensor module 111 is configured to detect one or more predetermined parameters of the construction element 100. The one or more predetermined parameters detected or determined by the sensor module 111 is explained in the following paragraphs. The sensor module 111 may include any other non-contact type sensors for determining the one or more predetermined parameters.

The system 200 includes a mechanism 112 engageable with the extruder 110. The mechanism 112 may be configured to be engaged with the extruder 110 by coupling through any suitable means such as, but not limited to, fastening and the like. The mechanism 112 may be configured to introduce reinforcement into the construction element 100. The mechanism 112 is further adapted to regulate predetermined characteristics of each layer of the construction element 100, as explained in the following paragraphs. The predetermined characteristics may include parameters such as, but not limited to, surface roughness, flatness, depth, height, width, uniformity, shape of layers being formed during discharging of the material from the extruder 110, and the like.

Figure 13:
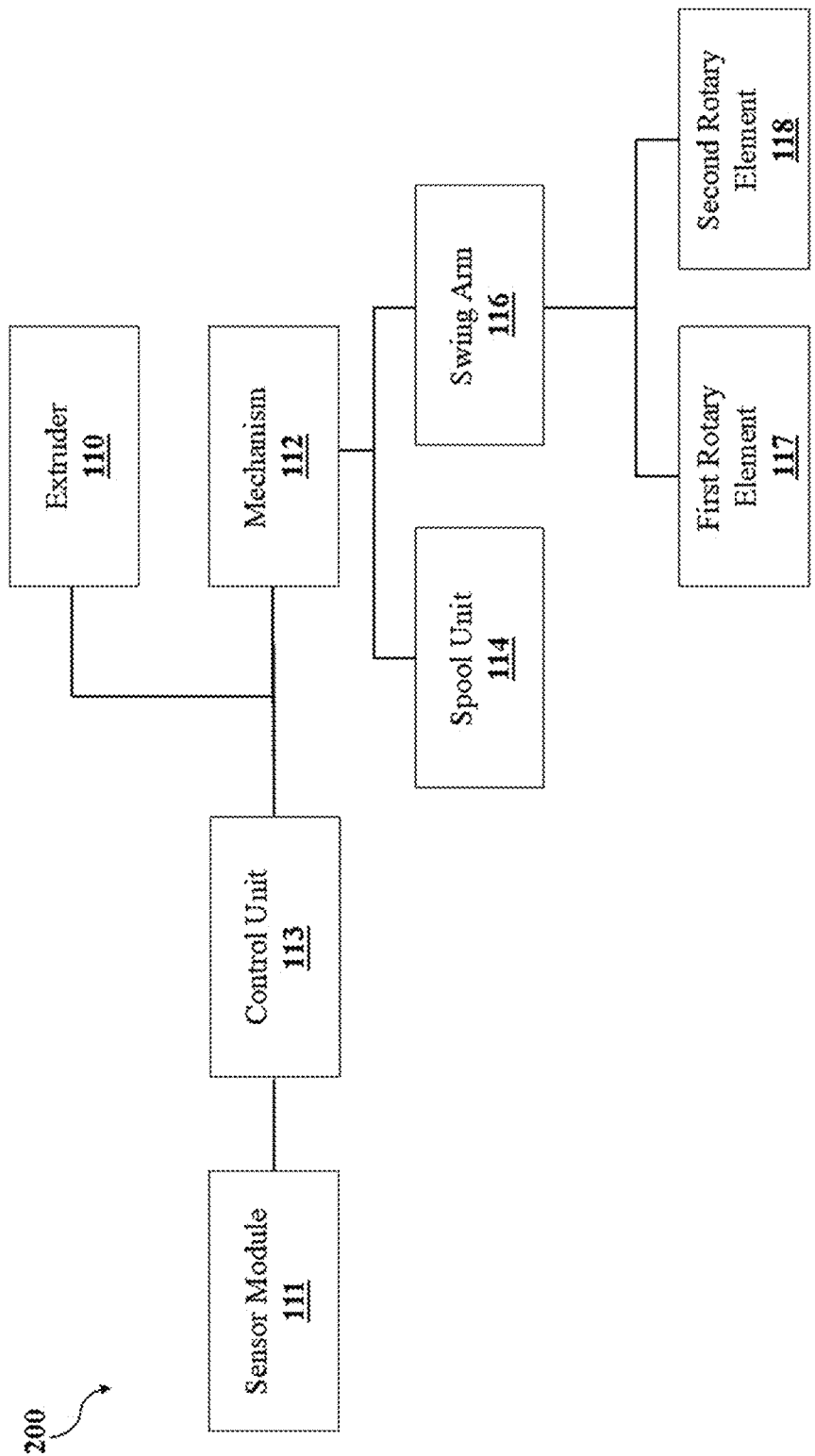
FIG. 13 illustrates a block diagram of the system of the FIGS. 10 to 12.

FIG. 13 illustrates a block diagram of the system 200, in accordance with the illustrative embodiments of FIGS. 10 to 12 of the present disclosure. As illustrated in the FIG. 13, the system 200 includes a control unit 113. The control unit 113 is communicatively coupled to the extruder 110, the sensor module 111 and the mechanism 112, as illustrated in the Figures. The control unit 113 is configured to regulate movement of the extruder 110, based on signals corresponding to the one or more predetermined parameters received from the sensor module 111. The control unit 113 is further configured to operate the mechanism 112 selectively, to regulate introduction of reinforcement into the construction element 100. The control unit 113 is also configured to regulate one or more of the predetermined characteristics of the construction element 100.

Referring now to the FIGS. 10 to 13, the mechanism 112 includes a spool unit 114 and a swing arm 116. While the FIGS. 10 to 12 show the spool unit 114 and the swing arm 116 being coupled to a portion of the spool unit 116, it is also to be understood that, in another implementation, the spool unit 116 and the swing arm 116 may be separate, and the swing arm 116 may be directly coupled or adapted to be mountable on to the extruder 110. The control unit 113 is configured to operate the spool unit 114, to introduce the reinforcement member 115 into a layer of the construction element 100. In one implementation, the spool unit 114 may be a motorized spool unit 114, which may be controlled based on signals from the control unit 113, to regulate length of the reinforcing member that may be insertable into the construction element 100. The spool unit 114 is configured to selectively introduce a reinforcement member 115 into the construction element 100. The spool unit 114 may be configured to insert/introduce the reinforcement member 115 with a predefined distance between two consecutive reinforcement members 115. The reinforcement member 115 may be a pin made from at least one a metallic material and a polymeric material. The pin may be inserted into a layer of the construction element 100, in a substantially vertical alignment as illustrated in the FIGS. 10 to 12. The pin may be inserted into the layer of the construction element 100, at an angle of 75 degrees to 105 degrees, relative to a surface 120 of the layer. The reinforcement member 115, upon being inserted into a bottom layer [the first layer that has been extruded/printed], improves bonding of a top layer [the successive layer being extruded/printed subsequently on the first layer] with the bottom layer. The reinforcement member 115 is adapted to increase resistance [of the layers of the construction element 100] to transverse loads [i.e., subjected to the loads being applied in a transverse direction relative to the construction element 100], that could induce inter-laminar stresses, whereby making the layers slip off.

The swing arm 116 is configured to swing relative to at least one of the extruder 110 and the spool unit 114. The swing arm 116 includes a first rotary element 117, a second rotary element 118, and an actuator 119. Further, the swing arm 116 is configured to selectively engage one of the first rotary element 117 or the second rotary element 118 with layers of the construction element 100, to regulate the predetermined characteristics of the construction element 100. The control unit 113 is further configured to operate the actuator 119 associated with the swing arm 116, to selectively engage one of the first rotary element 117 or the second rotary element 118 with the layer of the construction element 100. Further, operation of the spool unit 114 and the swing arm 116 is configured to regulate the predetermined characteristics of each layer of the construction element 100.

Figure 14:
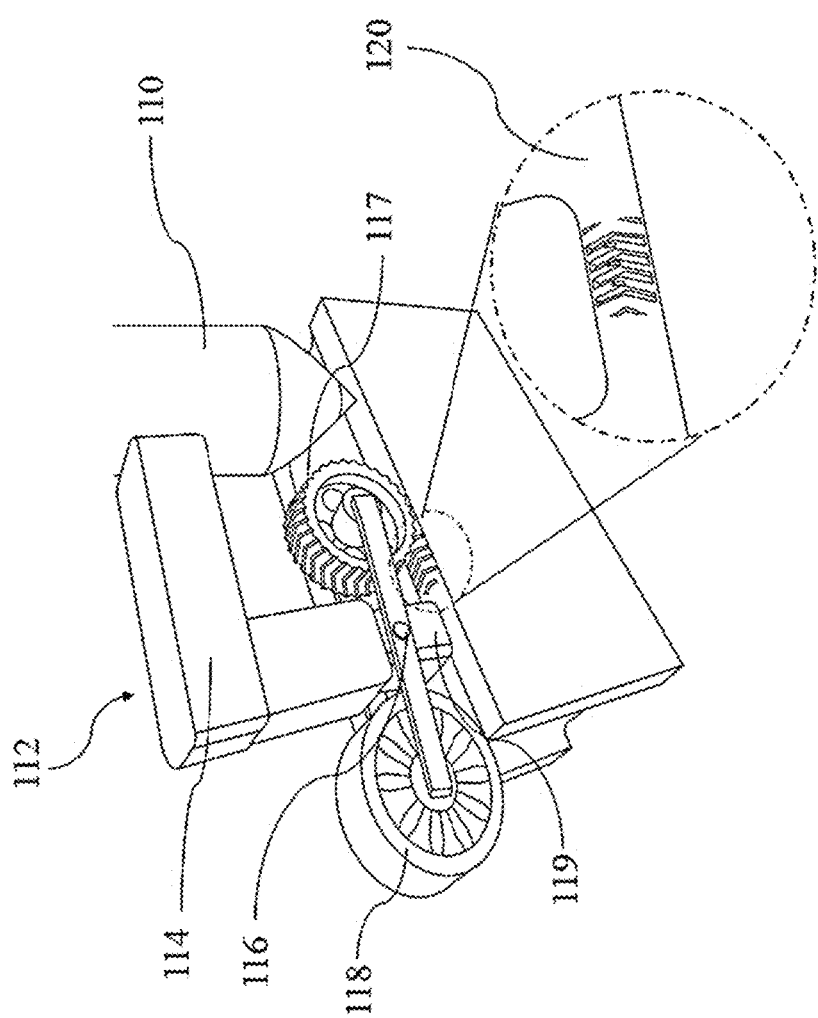
FIG. 14 illustrates a close up view of a mechanism of the system of the FIGS. 10 to 12.

FIG. 14 illustrates a close-up view of the mechanism 112. The first rotary element 117, upon engagement with each layer of the construction element 100, is configured to traverse over each layer to alter characteristics of the surface 120 each layer. The first rotary element 117 may be a Herringbone gear. The Herringbone gear upon traversing over each layer of the construction element 100, is configured to imprint herringbone pattern on the surface 120 of each layer. In one implementation, the first rotary element 117 may be any other type of gear suitable for imprinting a pattern on the surface 120 of each layer. In one implementation, the second rotary element 118 may be a flattening wheel. The second rotary element 118, upon traversing over each layer of the construction element 100, is configured to flatten the top layer [depicted as surface 120 in the FIG. 14].

In one implementation, the mechanism 112 may also include an injector. The injector may be configured to infuse a filler material 107 into at least some air pockets 106 of a plurality of air pockets 106 defined in the construction element 100.

In one implementation, a first filler material 107 [an insulation material, such as but not limited to, a foam] may be injected into the air pockets 106 constituting the second contour 131, by a first injector. Simultaneously, a second filler material 107 [another insulation material, such as but not limited to, a foam] may be injected into the air pockets 106 constituting the first contour 132, by a second injector. In another implementation, initially, the extruder 110 may print the inner matrix 103 up to a height of ¾ of the height of the injector [both the first injector and second injector]. Thereafter, the first injector starts infusing the first filler material 107 into the air pockets 106 constituting the second contour 131. Simultaneously, the second injector starts infusing the second filler material 107 into the air pockets 106 constituting the first contour 132. Subsequently, the extruder 110 may print the inner matrix 103 up to its full height. Thereafter, the first injector starts infusing the first filler material 107 into the air pockets 106 constituting the second contour 131, up to its full height. Simultaneously, the second injector starts infusing the second filler material 107 into the air pockets 106 constituting the first contour 132, up to its full height.

In an implementation, both the first rotary element 117 and the second rotary element 118 may be motorized rotating elements such as motorized wheels configured to perform different functions. The swing arm 116 may be connected to a stepper motor, in order to rotate a desired side of the swing arm 116, to the direction needed based on the printing sequences. Referring to FIG. 14, the first rotary element 117 being the Herringbone gear is traversed immediately on a layer of the construction element 100, soon after extrusion of said layer. The Herringbone gear upon traversing over said layer, imprints herringbone pattern on the surface 120, as the layer is still wet and is not fully solidified. Such imprinting increases surface roughness of said layer and facilitates improved bonding with a next layer that shall be extruded over said layer. Such imprinted layer has better bonding properties in comparison with a layer having smooth surface without imprints. Further, since the Herringbone gear generates a V-grooved shape pattern on the printed layer, such layer would increase inter-laminar engagement and support the printed layer against lateral forces. Such lateral forces could be induced during the printing process or due to seismic forces. Hence, imprinting pattern by the first rotary element 117 would prevent relative displacement between layers and resist lateral shear forces. Subsequent to the Herringbone gear imprinting the v-grooved pattern, the reinforcement member 115 pin is inserted by the motorized spool unit 114.

Further, the second rotary element 118 is configured to flatten surface of a printed layer in case of the printed layer having non-uniformity or having a protrusion/cavity or if being considered as uneven. Such unevenness, non-uniformity and protrusions/cavities are detected by the sensor module 111, and the control unit 113 upon receiving such inputs from the sensor module 111 triggers the second rotary element 118. The second rotary element 118 may be a straightening wheel [also referred to as 'flattening wheel']. The second rotary element 118 may be a wheel with a smooth outer surface [rim] configured to flatten unevenness of printed layer [with unevenness being measured relative to a predetermined normal surface level]. Upon detecting unevenness, the swing arm 116 is actuated to engage the rotary element with the printed layer.

An interaction between the sensor module 111, the control unit 113, the herringbone gear, and the straightening wheel may be as follows. Assuming the printed surface is flat in normal printing mode, the herringbone gear is engaged with the printed layer to achieve surface roughness by imprinting. Referring to FIG. 12, in case the sensor module 111 detects protrusion [such as a lump or a hump on the layer], the printing will be paused, and the swinging motor shall be actuated to engage the straightening wheel. The straightening wheel upon making contact with the protrusion, engages with the protrusion and traverses over the protrusion to flatten the surface of the printed layer adequately. Thereafter, the printing is resumed.

Further, referring to FIG. 11, in case the sensor module 111 detects faulty layers [collapses layer or cavity 108 in the printed layer], the sensor module 111 is configured to measures length, width and volume of the cavity 108 and determined volume of material required for substitution to fill the cavity 108. Thereafter, the material is extruded by the extruder 110 to fill the cavity 108 and flatten the surface 120 of the printed layer.

Figure 15:
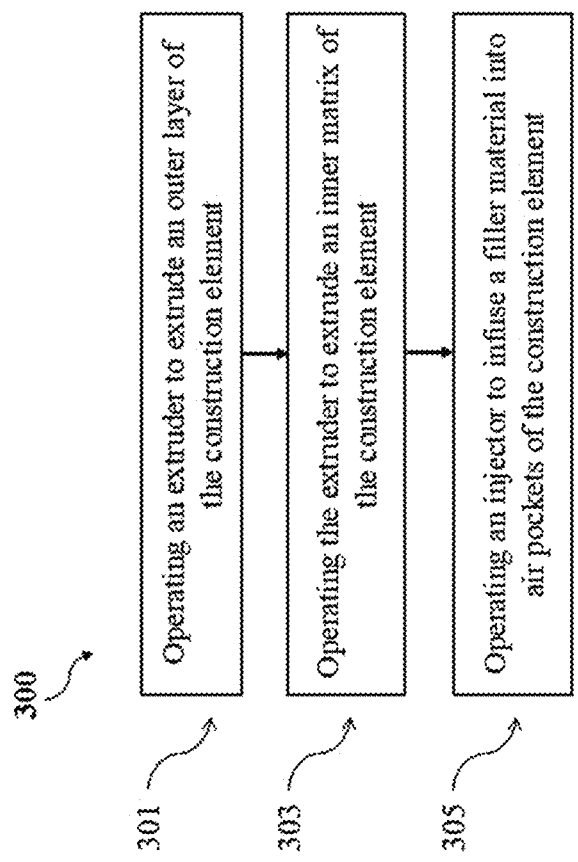
FIG. 15 illustrates a method for manufacturing the construction element, in accordance with an example of the present disclosure.

A third aspect of the disclosure concerns a method 300 for manufacturing a construction element 100. FIG. 15 illustrates the method 300 for manufacturing the construction element 100. The method 300 includes operating, by a control unit 113, an extruder 110 to extrude an outer layer 101, the outer layer 101 defining an enclosure 102. The method 300 further include operating, by the control unit 113, the extruder 110 to extrude an inner matrix 103 within the enclosure 102. The outer layer 101 and the inner matrix 103 are formed by depositing successive layers using an additive manufacturing system 200. The inner matrix 103 is defined by a first layup 104 and a second layup 105. The first layup 104 is laid along a first direction 121 and across the enclosure 102. Further, the second layup 105 is laid juxtaposing the first layup 104. The first layup 104 and the second layup 105 define a plurality of air pockets 106 in the inner matrix 103. The method 300 further includes operating, by the control unit 113, an injector to infuse a filler material 107 into at least some air pockets 106 of the plurality of air pockets 106.

The method 300 may also include defining one or more cavities 108 in the inner matrix 103. The one or more cavities 108 are defined between the outer layer 101 and one or more inner layers 123 of the construction element 100. Further, the method 300 may also include inserting an insert 109 into the one or more cavities 108, with the insert 109 being made of an insulating material.

The invention claimed is:

1. A construction element fabricated by an additive-manufacturing process, the construction element comprising:
an outer layer additively printed from a first material so as to define a closed-perimeter enclosure;
an inner matrix integrally additively printed within the enclosure from successive layers deposited during the same build operation related to printing the successive layers in forming the inner matrix, the inner matrix including:
a first layup of extruded filaments oriented along a first direction; and
a second layup of extruded filaments oriented along a second direction different from the first direction and intersecting the first layup,
whereby the first and second layups cooperatively delimit a plurality of closed air pockets; and a filler material different from the first material and selectively infused, during or after printing, into a predetermined subset of the air pockets so as to form at least one closed-loop contour entirely surrounded by unfilled air pockets.

2. The construction element of claim 1, wherein the first material of the outer layer and a second material of the inner matrix are the same composition.

3. The construction element of claim 1, wherein the first material is different from a second material that forms the inner matrix, the first and second materials being co-extruded in successive layers.

4. The construction element of claim 1, wherein the inner matrix is printed from a blend comprising clay, plastic particles recovered from post-consumer waste, and carbon powder.

5. The construction element of claim 1, wherein the filler material comprises a foamed polymer or other synthetic insulating foam.

6. The construction element of claim 1, wherein the selectively filled air pockets define concentric inner and outer rectangular contours.

7. The construction element of claim 1, further comprising at least one inner layer, printed with substantially the same cross-sectional configuration as the outer layer, the inner layer and the outer layer cooperatively defining at least one cavity within the inner matrix.

8. The construction element of claim 7, wherein the cavity lies adjacent to a peripheral region of the outer layer.

9. The construction element of claim 7, wherein the cavity lies substantially centrally of the outer layer.

10. The construction element of claim 7, wherein the cavity is C-shaped, S-shaped, arcuate, semi-circular or rectangular.

11. The construction element of claim 7, further comprising an insert received within the cavity, the insert being formed of compressed plastic waste, compressed natural fibres, or a combination thereof.

12. The construction element of claim 11, wherein the compressed natural fibres include at least one of dried and milled palm-trunk wood, dried palm leaves, date-palm leaves, crushed date pits or wood, the fibres being consolidated with a binder comprising okra powder and water.

13. The construction element of claim 1, wherein the unfilled air pockets and the selectively filled air pockets together establish a total thermal resistance greater than that obtained by a homogeneous wall of equal thickness printed from the first material alone.

14. The construction element of claim 1, wherein the outer layer has a thickness of one printed layer, the inner matrix directly adjoining the outer layer on an inner surface thereof.

15. The construction element according to claim 1, wherein the first layup and the second layup crisscross each other at an angle in a range of 40 degrees to 50 degrees.

16. The construction element according to claim 1, wherein the plurality of closed air pockets collectively occupies at least fifty percent of the volume bounded by the outer layer.

* * * * *